United States Patent
Yu et al.

(10) Patent No.: US 11,019,480 B2
(45) Date of Patent: May 25, 2021

(54) DEVICE ACCESS METHOD, DEVICE, AND SYSTEM

(71) Applicant: Huawei Technologies Co., Ltd., Shenzhen (CN)

(72) Inventors: Youyang Yu, Shanghai (CN); Hancheng Li, Shanghai (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 16/741,106

(22) Filed: Jan. 13, 2020

(65) Prior Publication Data

US 2020/0154262 A1 May 14, 2020

Related U.S. Application Data

(63) Continuation of application No. PCT/CN2018/094960, filed on Jul. 9, 2018.

(30) Foreign Application Priority Data

Jul. 11, 2017 (CN) .......................... 201710562454.1

(51) Int. Cl.
*H04W 4/00* (2018.01)
*H04W 8/04* (2009.01)
(Continued)

(52) U.S. Cl.
CPC .............. *H04W 8/04* (2013.01); *H04B 7/155* (2013.01); *H04L 61/2007* (2013.01);
(Continued)

(58) Field of Classification Search
CPC ......... H04W 12/0013; H04W 12/0017; H04W 12/04033; H04W 12/0602;
(Continued)

(56) References Cited

U.S. PATENT DOCUMENTS 8,195,778 B1 * 6/2012 Leung ..................... H04L 12/66
709/222
8,994,493 B2 * 3/2015 Nakamoto ........... G05B 19/418
340/3.9

(Continued)

FOREIGN PATENT DOCUMENTS

| CN | 106059647 A | 10/2016 |
| CN | 106162803 A | 11/2016 |

(Continued)

OTHER PUBLICATIONS

S2-133638, Vodafone, "Additions to "Solution R9: Reuse of Architecture A1 from TR 36.806" for Public Safety UE-Network Relays," SA WG2 Meeting #99, Sep. 23-27, 2013, Xiamen, P.R. China, 6 pages.

(Continued)

*Primary Examiner* — Joseph Arevalo
(74) *Attorney, Agent, or Firm* — Conley Rose, P.C.

(57) ABSTRACT

A device access method includes obtaining, by a mobility management entity, an identifier of a remote device and an identifier of a relay device, determining, by the mobility management entity based on at least one of the identifier of the remote device or the identifier of the relay device, to allow the remote device to access the network using the relay device, and sending, by the mobility management entity, a registration success message to the remote device using the relay device.

21 Claims, 8 Drawing Sheets

(51) Int. Cl.
*H04B 7/155* (2006.01)
*H04L 29/12* (2006.01)
*H04W 8/18* (2009.01)
*H04W 8/26* (2009.01)
*H04W 28/02* (2009.01)
*H04W 88/16* (2009.01)

(52) U.S. Cl.
CPC .............. *H04W 8/18* (2013.01); *H04W 8/26* (2013.01); *H04W 28/0268* (2013.01); *H04L 61/6022* (2013.01); *H04W 88/16* (2013.01)

(58) Field of Classification Search
CPC ......... H04W 12/1006; H04W 36/0038; H04W 48/02; H04W 76/10; H04W 8/24; H04W 48/08; H04W 88/16; H04W 24/02; H04W 4/50; H04W 4/70; H04W 84/22; H04W 92/02; H04W 92/045; H04W 92/12; H04W 12/06; H04W 28/0268; H04W 28/24; H04W 8/04; H04W 8/18; H04W 8/26; H04W 36/385; H04W 84/045; H04W 60/00; H04W 76/18; H04W 76/27
USPC ... 455/426.1, 435.1, 445, 404.1, 456.3, 433, 455/522, 436, 446, 450, 443
See application file for complete search history.

(56) References Cited

U.S. PATENT DOCUMENTS

| | | | | |
|---|---|---|---|---|
| 2006/0090074 | A1* | 4/2006 | Matoba | H04L 63/04 713/171 |
| 2006/0190458 | A1* | 8/2006 | Mishina | H04L 67/125 |
| 2008/0104687 | A1* | 5/2008 | Fujiwara | H04W 12/001 726/10 |
| 2011/0244851 | A1 | 10/2011 | Gunnarsson et al. | |
| 2012/0044836 | A1* | 2/2012 | Sivavakeesar | H04W 24/02 370/255 |
| 2016/0044573 | A1 | 2/2016 | Aminaka | |
| 2016/0197927 | A1* | 7/2016 | Ma | H04L 45/245 726/4 |
| 2018/0132293 | A1* | 5/2018 | Escott | H04W 12/1006 |
| 2018/0295556 | A1 | 10/2018 | Baek et al. | |
| 2019/0028337 | A1* | 1/2019 | Ryu | H04W 4/70 |
| 2019/0116483 | A1* | 4/2019 | Ryu | H04W 36/0022 |
| 2019/0116531 | A1* | 4/2019 | Ryu | H04W 4/70 |
| 2019/0274051 | A1* | 9/2019 | Li | H04L 63/123 |
| 2019/0335332 | A1* | 10/2019 | Ying | H04W 12/04031 |
| 2020/0008127 | A1* | 1/2020 | Ohtsuji | H04L 1/0005 |
| 2020/0015192 | A1* | 1/2020 | Chun | H04W 60/00 |
| 2020/0169877 | A1* | 5/2020 | Kim | H04W 12/06 |

FOREIGN PATENT DOCUMENTS

| | | |
|---|---|---|
| CN | 106454993 A | 2/2017 |
| CN | 106470382 A | 3/2017 |
| WO | 2015005900 A1 | 1/2015 |
| WO | 2017052342 A1 | 3/2017 |

OTHER PUBLICATIONS

"Part 11: Wireless LAN Medium Access Control (MAC) and Physical Layer (PHY) Specifications," IEEE Std 802.11™—2016 (Revision of IEEE Std 802.11—2012), IEEE Computer Society, 3534 pages.

* cited by examiner

DEVICE ACCESS METHOD, DEVICE, AND SYSTEM

CROSS-REFERENCE TO RELATED APPLICATIONS

This application is a continuation of International Patent Application No. PCT/CN2018/094960 filed on Jul. 9, 2018, which claims priority to Chinese Patent Application No. 201710562454.1 filed on Jul. 11, 2017. The disclosures of the aforementioned applications are hereby incorporated by reference in their entireties.

TECHNICAL FIELD

This application relates to the field of communications technologies, and in particular, to a device access method, device, and system.

BACKGROUND

To address challenges from wireless broadband technologies and ensure that 3rd Generation Partnership Project (3GPP) networks are leading the way, the 3GPP standard organization formulated a network architecture of a next generation mobile communications system (next generation system), which is referred to as a 5th generation (5G) network architecture by the end of 2016. This architecture not only supports access to a 5G core network using a wireless technology defined by the 3GPP standard organization, but also supports access to the 5G core network using a non-3GPP access technology, for example, supports access to the 5G core network using a fixed network.

In addition, it is discussed in a standard that, in the future a 5G network needs to support not only mobile devices of mobile operators, but also support fixed network devices, such as home gateway customer premise equipment (CPE) or a residential gateway. The mobile devices may access the 5G network using the fixed network devices in the future.

However, currently there is no related solution for how a remote device accesses a network using a relay device.

SUMMARY

Embodiments of this application provide a device access method, device, and system such that a remote device can access a network using a relay device.

To achieve the foregoing objective, the embodiments of this application provide the following technical solutions.

According to a first aspect, an embodiment of this application provides a device access method, where the method includes obtaining, by a mobility management entity, an identifier of a remote device and an identifier of a relay device, determining, by the mobility management entity based on at least one of the identifier of the remote device and the identifier of the relay device, to allow the remote device to access a network using the relay device, and sending, by the mobility management entity, a registration success message to the remote device using the relay device. The mobility management entity may obtain the identifier of the remote device and the identifier of the relay device. That is, the mobility management entity may identify the remote device and the relay device, and further determine, based on at least one of the identifier of the remote device and the identifier of the relay device to allow the remote device to access the network using the relay device. Therefore, the remote device can access the network using the relay device in this solution.

Optionally, the identifier of the relay device may be, for example, at least one of the following identifiers of the relay device: a permanent identifier, a temporary identifier, a media access control (MAC) address, an Internet Protocol (IP) address, a line identifier, a second N2 interface temporary identifier allocated by an access gateway function (AGF) entity to the relay device, a fourth N2 interface temporary identifier allocated by an access and mobility management function (AMF) entity to the relay device, a user name, or a device identifier of another type. This is not limited in this embodiment of this application. A network side may identify the relay device based on the identifier of the relay device.

Optionally, the identifier of the remote device may be at least one of the following identifiers of the remote device: a permanent identifier, a temporary identifier, a MAC address, or an IP address. The permanent identifier of the remote device may be, for example, an international mobile subscriber identity (IMSI) of the remote device. The temporary identifier of the remote device may be, for example, a globally unique temporary identity (GUTI) allocated by the network side to the remote device. This is not limited in this embodiment of this application.

Optionally, obtaining, by a mobility management entity, an identifier of a remote device and an identifier of a relay device includes receiving, by the mobility management entity, a first registration request message from the remote device, where the first registration request message includes the identifier of the remote device and the identifier of the relay device.

Alternatively, obtaining, by a mobility management entity, an identifier of a remote device and an identifier of a relay device includes receiving, by the mobility management entity, a first message from an AGF entity, where the first message includes the identifier of the relay device and a second registration request message, and the second registration request message includes the identifier of the remote device.

Alternatively, optionally, obtaining, by a mobility management entity, an identifier of a remote device and an identifier of a relay device includes receiving, by the mobility management entity, a second message from an AGF entity, where the second message includes a line identifier and a third registration request message, and the third registration request message includes the identifier of the remote device, and obtaining, by the mobility management entity, the identifier of the relay device based on the line identifier.

Alternatively, optionally, obtaining, by a mobility management entity, an identifier of a remote device and an identifier of a relay device includes receiving, by the mobility management entity, a fourth registration request message from an AGF entity, where the fourth registration request message includes the identifier of the remote device and a line identifier, and obtaining, by the mobility management entity, the identifier of the relay device based on the line identifier.

In the foregoing implementation, the mobility management entity may obtain the identifier of the remote device and the identifier of the relay device.

Optionally, determining, by the mobility management entity based on at least one of the identifier of the remote device and the identifier of the relay device, to allow the remote device to access a network using the relay device includes obtaining, by the mobility management entity, context information or subscription data of the relay device based on the identifier of the relay device, determining, by the mobility management entity based on the context information or the subscription data of the relay device, that the relay device allows the remote device to access the network using the relay device, obtaining, by the mobility management entity, subscription data of the remote device based on the identifier of the remote device, and determining, by the mobility management entity based on the subscription data of the remote device, that the remote device is allowed to access the network using the relay device.

Alternatively, optionally, determining, by the mobility management entity based on at least one of the identifier of the remote device and the identifier of the relay device, to allow the remote device to access a network using the relay device includes obtaining, by the mobility management entity, context information of the relay device based on the identifier of the relay device, determining, by the mobility management entity based on the context information of the relay device, that an access point at which the relay device is currently located allows the remote device to access the network using the access point, obtaining, by the mobility management entity, subscription data of the remote device based on the identifier of the remote device, and determining, by the mobility management entity based on the subscription data of the remote device, that an access point at which the remote device is currently located allows the remote device to access the network.

That is, in the foregoing two implementations, capabilities of both the remote device and the relay device need to be verified. The remote device is allowed to access the network using the relay device only when the capabilities of both the remote device and the relay device support.

Optionally, determining, by the mobility management entity based on at least one of the identifier of the remote device and the identifier of the relay device, to allow the remote device to access a network using the relay device includes obtaining, by the mobility management entity, context information or subscription data of the relay device based on the identifier of the relay device, determining, by the mobility management entity based on the context information or the subscription data of the relay device, to allow the remote device to access the network using the relay device, or determining, by the mobility management entity based on the context information of the relay device, that an access point at which the relay device is currently located allows the remote device to access the network using the access point. That is, in this implementation, it is considered that the remote device is allowed to access the network using the relay device. In this case, only a capability of the relay device or an access point at which the relay device is currently located needs to be verified. When the capability of the relay device or the access point at which the relay device is currently located supports, the remote device is allowed to access the network using the relay device.

Alternatively, optionally, the determining, by the mobility management entity based on at least one of the identifier of the remote device and the identifier of the relay device, to allow the remote device to access a network using the relay device includes obtaining, by the mobility management entity, subscription data of the remote device based on the identifier of the remote device, determining, by the mobility management entity based on the subscription data of the remote device, to allow the remote device to access the network using the relay device, or determining, by the mobility management entity based on the subscription data of the remote device, that an access point at which the remote device is currently located allows the remote device to access the network. That is, in this implementation, it is considered that the relay device allows the remote device to access the network using the relay device. In this case, only a capability of the remote device or the access point at which the remote device is currently located needs to be verified. When the capability of the remote device or the access point at which the remote device is currently located supports, the remote device is allowed to access the network using the relay device.

In the foregoing implementation, the mobility management entity may determine to allow the remote device to access the network using the relay device.

Optionally, after obtaining, by a mobility management entity, an identifier of a remote device and an identifier of a relay device, the method further includes establishing, by the mobility management entity, a correspondence between the remote device and the relay device based on the identifier of the remote device and the identifier of the relay device, and after the sending, by the mobility management entity, a registration success message to the remote device using the relay device, the method further includes sending, by the mobility management entity according to the correspondence, a quality of service (QoS) rule corresponding to a service flow of the remote device to the relay device, where the QoS rule is used to perform QoS control on a data packet sent by the remote device. In this solution, the relay device may perform QoS control on the data packet sent by the remote device.

According to a second aspect, an embodiment of this application provides a device access method, where the method includes obtaining, by a mobility management entity, an identifier of a remote device and an identifier of a relay device, determining, by the mobility management entity based on at least one of the identifier of the remote device and the identifier of the relay device, to allow the remote device to access a network using the relay device, sending, by the mobility management entity, a registration success message to an AGF entity, and receiving, by the AGF entity, the registration success message from the mobility management entity, and sending the registration success message to the remote device using the relay device. The mobility management entity may obtain the identifier of the remote device and the identifier of the relay device. That is, the mobility management entity may identify the remote device and the relay device, and further determine, based on at least one of the identifier of the remote device and the identifier of the relay device, to allow the remote device to access the network using the relay device. Therefore, the remote device may access the network using the relay device in this solution.

Optionally, the method further includes obtaining, by the AGF entity, the identifier of the remote device and the identifier of the relay device, and establishing, by the AGF entity, a correspondence between the remote device and the relay device based on the identifier of the remote device and the identifier of the relay device. In this way, after identifying the remote device in a subsequent process, the AGF entity may communicate with the remote device using the relay device according to a binding relationship between the remote device and the relay device. This is not limited in this embodiment of this application.

Optionally, obtaining, by the AGF entity, the identifier of the remote device and the identifier of the relay device includes receiving, by the AGF entity, the identifier of the remote device and the identifier of the relay device that are from the relay device.

Alternatively, optionally, obtaining, by the AGF entity, the identifier of the remote device and the identifier of the relay device includes receiving, by the AGF entity, a first message from the relay device, where the first message includes the identifier of the remote device, and a source MAC address in the first message is a MAC address of the relay device, and obtaining, by the AGF entity, the identifier of the relay device based on the source MAC address in the first message Alternatively, optionally, obtaining, by the AGF entity, the identifier of the remote device and the identifier of the relay device includes receiving, by the AGF entity, a second message from the relay device, where the second message includes a line identifier and the identifier of the remote device, and obtaining, by the AGF entity, the identifier of the relay device based on the line identifier.

In the foregoing implementation, the AGF entity may identify the remote device and the relay device.

Optionally, after obtaining, by the AGF entity, the identifier of the relay device, the method further includes selecting, by the AGF entity based on the identifier of the relay device, a mobility management entity communicatively connected to the relay device as the mobility management entity. In this way, the mobility management entity corresponding to the remote device may be selected.

Optionally, selecting, by the AGF entity based on the identifier of the relay device, a mobility management entity connected to the relay device as the mobility management entity includes determining, by the AGF entity based on the identifier of the relay device, that a context of the relay device is stored in the AGF entity, and determining, by the AGF entity, a mobility management entity corresponding to a mobility management entity identifier in the context of the relay device as the mobility management entity.

Optionally, after establishing, by the AGF entity, a correspondence between the remote device and the relay device based on the identifier of the remote device and the identifier of the relay device, the method further includes allocating, by the AGF entity, at least one of a non-access stratum (NAS) IP address and a local IP address of the remote device to the remote device, and sending, by the AGF entity, the at least one of the NAS IP address and the local IP address of the remote device to the remote device, where the local IP address of the remote device is used to identify the remote device, and the NAS IP address is used to identify a NAS message.

Alternatively, optionally, after establishing, by the AGF entity, a correspondence between the remote device and the relay device based on the identifier of the remote device and the identifier of the relay device, the method further includes allocating, by the AGF entity, a NAS MAC address to the remote device, and sending, by the AGF entity, the NAS MAC address to the remote device, where the NAS MAC address is used to identify a NAS message.

Alternatively, optionally, the method further includes allocating, by the relay device, at least one of a NAS IP address and a local IP address of the remote device to the remote device, and sending, by the relay device, the at least one of the NAS IP address and the local IP address of the remote device to the remote device, where the local IP address of the remote device is used to identify the remote device, and the NAS IP address is used to identify a NAS message.

Alternatively, optionally, the method further includes allocating, by the relay device, a NAS MAC address to the remote device, and sending, by the relay device, the NAS MAC address to the remote device, where the NAS MAC address is used to identify a NAS message.

In this solution, the remote device may obtain the NAS IP address or the NAS MAC address used to identify the NAS message.

Optionally, the method further includes receiving, by the relay device, a QoS rule corresponding to a service flow of the remote device from the mobility management entity, and performing, by the relay device according to the QoS rule, QoS control on a data packet sent by the remote device. In this solution, the relay device may perform QoS control on the data packet sent by the remote device.

Optionally, the method further includes receiving, by the relay device, the identifier of the remote device and the identifier of the relay device that are from the remote device, and sending, by the relay device, the identifier of the remote device and the identifier of the relay device to the AGF entity.

Alternatively, optionally, the method further includes receiving, by the relay device, the identifier of the remote device from the remote device, and sending, by the relay device, the identifier of the remote device and the identifier of the relay device to the AGF entity.

Optionally, the method further includes sending, by the remote device, the NAS message to the relay device, where a destination address of the NAS message is the NAS IP address, or the destination address of the NAS message is the NAS MAC address.

Optionally, the method further includes receiving, by the remote device, the identifier of the relay device sent by the relay device, and sending, by the remote device, the identifier of the remote device and the identifier of the relay device to the relay device.

According to a third aspect, an embodiment of this application provides a mobility management entity. The mobility management entity has a function of implementing the method according to the first aspect. The function may be implemented by hardware, or may be implemented by hardware by executing corresponding software. The hardware or software includes one or more modules corresponding to the foregoing function.

According to a fourth aspect, an embodiment of this application provides a mobility management entity, including a processor, a memory, a bus, and a communications interface. The memory is configured to store a computer executable instruction. The processor and the memory are connected using the bus. When the mobility management entity runs, the processor executes the computer executable instruction stored in the memory, to enable the mobility management entity to execute the device access method according to any one of the implementations of the first aspect.

According to a fifth aspect, an embodiment of this application provides a computer-readable storage medium. The computer-readable storage medium stores an instruction. When the instruction runs on a computer, the computer is enabled to perform the device access method according to any one of the implementations of the first aspect.

According to a sixth aspect, an embodiment of this application provides a computer program product that includes an instruction. When the computer program product runs on a computer, the computer is enabled to perform the device access method according to any one of the implementations of the first aspect.

According to a seventh aspect, this application provides a chip system. The chip system includes a processor configured to support a mobility management entity to implement the functions in the foregoing aspects. For example, the mobility management entity determines, based on at least one of an identifier of a remote device and an identifier of a relay device, to allow the remote device to access a network using the relay device. In a possible design, the chip system further includes a memory. The memory is configured to store a program instruction and data required by the mobility management entity. The chip system may include a chip, or may include a chip and another discrete component.

For technical effects brought by any implementation of the third aspect to the seventh aspect, refer to technical effects brought by different design manners of the first aspect. Details are not described herein again.

According to an eighth aspect, a device access system is provided, including a mobility management entity and an AGF entity. The mobility management entity is configured to obtain an identifier of a remote device and an identifier of a relay device, determine, based on at least one of the identifier of the remote device and the identifier of the relay device, to allow the remote device to access a network using the relay device, and send a registration success message to the remote device using the relay device. The AGF entity is configured to receive the registration success message from the mobility management entity, and send the registration success message to the remote device using the relay device.

Optionally, the AGF entity is further configured to obtain the identifier of the remote device and the identifier of the relay device, and establish a correspondence between the remote device and the relay device based on the identifier of the remote device and the identifier of the relay device.

Optionally, the AGF entity is further configured to, after obtaining the identifier of the relay device, select, based on the identifier of the relay device, a mobility management entity communicatively connected to the relay device as the mobility management entity.

Optionally, the AGF entity is further configured to, after establishing the correspondence between the remote device and the relay device based on the identifier of the remote device and the identifier of the relay device, allocate at least one of a NAS IP address and a local IP address of the remote device to the remote device, and the AGF entity is further configured to send the at least one of the NAS IP address and the local IP address of the remote device to the remote device, where the local IP address of the remote device is used to identify the remote device, and the NAS IP address is used to identify a NAS message.

Optionally, the AGF entity is further configured to, after establishing the correspondence between the remote device and the relay device based on the identifier of the remote device and the identifier of the relay device, allocate a NAS MAC address to the remote device, and the AGF entity is further configured to send the NAS MAC address to the remote device, where the NAS MAC address is used to identify a NAS message.

For a technical effect brought by any design manner of the eighth aspect, refer to the technical effects of different design manners in the second aspect. Details are not described herein again.

These aspects or other aspects in this application may be clearer and easier to understand in description of the following embodiments.

DESCRIPTION OF EMBODIMENTS

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the description of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application are also applicable to similar technical issues as the network architecture evolves and a new service scenario emerges.

Figure 1:
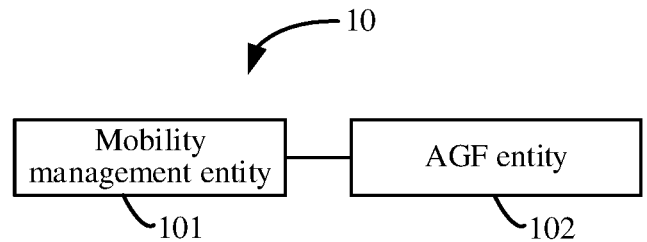
FIG. 1 is a schematic diagram of an architecture of a device access system according to an embodiment of this application.

FIG. 1 is a schematic diagram of an architecture of a device access system 10 according to the embodiments of this application. The device access system 10 includes a mobility management entity 101 and an AGF entity 102.

The mobility management entity 101 is configured to obtain an identifier of a remote device and an identifier of a relay device, and determine, based on at least one of the identifier of the remote device and the identifier of the relay device, to allow the remote device to access a network using the relay device.

The mobility management entity 101 is further configured to send a registration success message to the AGF entity 102.

The AGF entity 102 is configured to receive the registration success message from the mobility management entity 101, and send the registration success message to the remote device using the relay device.

Optionally, the remote device in the embodiments of this application may also be referred to as a mobile device. The remote device may be various handheld devices, vehicle-mounted devices, wearable devices, computing devices, or other processing devices connected to a wireless modem that have a wireless communication function. The remote device may further be a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, or the like. This is not limited in the embodiments of this application.

Optionally, the relay device in the embodiments of this application may also be referred to as a fixed network device, and may be a home gateway or the foregoing mobile device. The home gateway may be CPE, a residential gateway (RG), or the like. This is not limited in the embodiments of this application.

Optionally, the mobility management entity 101 and the AGF entity 102 in FIG. 1 may directly communicate with each other, or may communicate with each other through forwarding by another network device. This is not limited in the embodiments of this application.

In the device access system provided in the embodiments of this application, the mobility management entity may obtain the identifier of the remote device and the identifier of the relay device. That is, the mobility management entity may identify the remote device and the relay device, and further determine, based on at least one of the identifier of the remote device and the identifier of the relay device, to allow the remote device to access the network using the relay device. Therefore, the remote device may access the network using the relay device in this solution.

Optionally, the device access system 10 may be applied to a 5G network and another future network that support fixed network access. This is not limited in the embodiments of this application.

Figure 2:
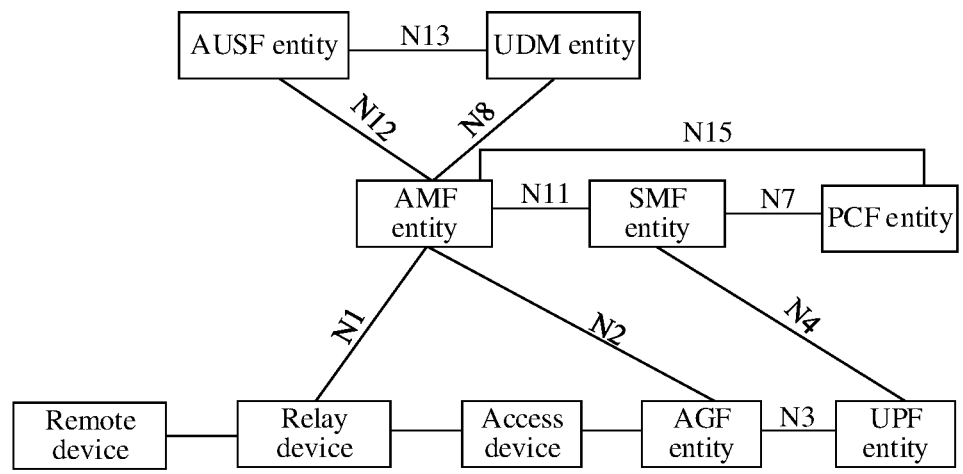
FIG. 2 is a schematic diagram of a structure of a device access system based on a 5G network supporting fixed network access according to an embodiment of this application.

If the device access system 10 is applied to the 5G network that supports fixed network access, as shown in FIG. 2, a network element or entity corresponding to the mobility management entity 101 may be an AMF entity. A network element or entity corresponding to the AGF entity 102 may be an AGF entity. For main functions of the AMF entity, refer to the description of the mobility management entity 101. For main functions of the AGF entity, refer to the description of the AGF entity 102. Details are not described herein again.

In addition, as shown in FIG. 2, the 5G network that supports fixed network access may further include an access device, a unified data management (UDM) entity, an authentication server function (AUSF) entity, a session management function (SMF) entity, a policy control function (PCF) entity, a user plane function (UPF) entity, and the like. In the embodiments of this application, the remote device accesses the 5G network using the relay device. The relay device communicates with the AMF entity using a next-generation network (N) interface 1 (N1), and communicates with the AGF entity using the access device. The AGF entity communicates with the AMF entity using an N interface 2 (N2). The AMF entity communicates with the SMF entity using an N interface 11 (N11). The AMF entity communicates with the UDM entity using an N interface 8 (N8). The AMF entity communicates with the AUSF entity using an N interface 12 (N12). The AMF entity communicates with the PCF entity using an N interface 15 (N15). The SMF entity communicates with the PCF entity using an N interface 7 (N7). The SMF entity communicates with the UPF entity using an N interface 4 (N4).

In addition, the UDM entity, the AUSF entity, the PCF entity, the AMF entity, and the SMF entity in FIG. 2 may also be collectively referred to as a control plane (CP) function entity. This is not limited in the embodiments of this application.

It should be noted that, the access device, the AMF entity, the SMF entity, the AUSF entity, the UDM entity, the AGF entity, the UPF entity, and the PCF entity in the 5G network are only names. The names do not constitute a limitation on devices themselves. In the 5G network and the other further network, network elements or entities corresponding to the access device, the AMF entity, the SMF entity, the AUSF entity, the UDM entity, the AGF entity, the UPF entity, and the PCF entity may have other names. This is not limited in the embodiments of this application. For example, the UDM entity may be replaced with a home subscriber server (HSS), a user subscription database (USD) entity, a database entity, or the like. A description is provided herein, and details are not described below again.

Optionally, the access device in the embodiments of this application refers to a non-3GPP access device.

Optionally, in addition to the functions of the mobility management entity 101 in FIG. 1, the AMF entity in the embodiments of this application may further have functions such as registration management, mobility management, and lawful interception.

Optionally, the SMF entity in the embodiments of this application is configured to perform session management and control functions, including establishing, modifying, and releasing a session, allocating and managing an IP address of a device, selecting and controlling the UPF entity, lawful interception, and the like.

Optionally, the UPF entity in the embodiments of this application may be responsible for processing functions such as forwarding a packet and collecting statistics for the remote device. For example, the UPF entity may perform UPFs of a serving gateway (SGW) and a packet data network (PDN) gateway (PGW). The UPF entity may also be a software-defined network (SDN) switch. This is not limited in the embodiments of this application.

Optionally, the AUSF entity in the embodiments of this application is configured to perform authentication on a device based on subscription data of the device.

Optionally, the UDM entity in the embodiments of this application is configured to store subscription data. In addition, the UDM entity further includes functions such as authentication, user identity processing, and subscription management.

Optionally, the mobility management entity 101 or the AGF entity 102 in FIG. 1 may be implemented using one physical device or a plurality of physical devices, or may be a logical functional module in a physical device. This is not limited in the embodiments of this application.

Figure 3:
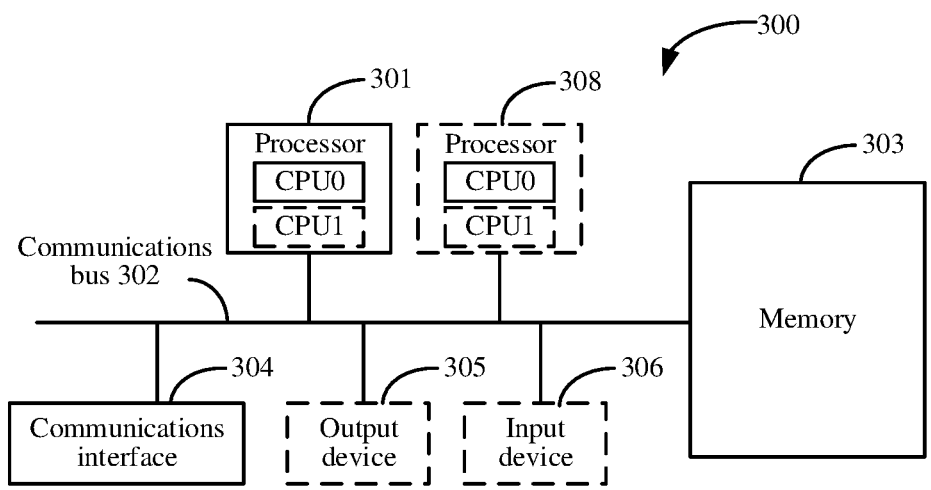
FIG. 3 is a schematic diagram of a hardware structure of a communications device according to an embodiment of this application.

For example, as shown in FIG. 3, both the mobility management entity 101 and the AGF entity 102 in FIG. 1 may be implemented using a communications device in FIG. 3.

FIG. 3 is a schematic diagram of a hardware structure of a communications device according to an embodiment of this application. A communications device 300 includes at least one processor 301, a communications bus 302, a memory 303, and at least one communications interface 304.

The processor 301 may be a general-purpose central processing unit (CPU), a microprocessor, an application-specific integrated circuit (ASIC), or one or more integrated circuits configured to control program execution of the solutions in this application.

The communications bus 302 may include a channel for transmitting information between the components.

The communications interface 304, which uses any apparatus such as a transceiver, is configured to communicate with another device or communications network, such as Ethernet, a radio access network (RAN), or a wireless local area network (WLAN).

The memory 303 may be a read-only memory (ROM), another type of static storage device capable of storing static information and instructions, a random access memory (RAM), or another type of dynamic storage device capable of storing information and instructions, or may be an electrically erasable programmable ROM (EEPROM), a compact disc ROM (CD-ROM) or another compact disc storage, an optical disc storage (including a compressed optical disc, a laser disc, an optical disc, a digital versatile disc, a BLU-RAY DISC, and the like), a magnetic disk storage medium or another magnetic storage device, or any other medium capable of carrying or storing expected program code in a form of instructions or data structures and capable of being accessed by a computer, but is not limited thereto. The memory 303 may exist independently, and is connected to the processor 301 using the communications bus 302. The memory 303 may be alternatively integrated with the processor 301.

The memory 303 is configured to store application program code for executing the solutions in this application, and the processor 301 controls the execution. The processor 301 is configured to execute the application program code stored in the memory 303 to implement a device access method provided in the following embodiments of this application.

During specific implementation, in one embodiment, the processor 301 may include one or more CPUs, for example, a CPU 0 and a CPU 1 in FIG. 3.

During specific implementation, in one embodiment, the communications device 300 may include a plurality of processors, such as the processors 301 and 308 in FIG. 3. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in one embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive input of a user in a plurality of manners. For example, the input device 306 may be a mouse, a keyboard, a touchscreen device, or a sensing device.

The communications device 300 may be a general-purpose or dedicated communications device. During specific implementation, the communications device 300 may be a desktop computer, a portable computer, a network server, a PDA, a mobile phone, a tablet computer, a wireless terminal device, an embedded device, or a device with a structure similar to that in FIG. 3. A type of the communications device 300 is not limited in this embodiment of this application.

The following describes in detail a device access method provided in this embodiment of this application with reference to FIG. 1 to FIG. 3.

Figure 4:
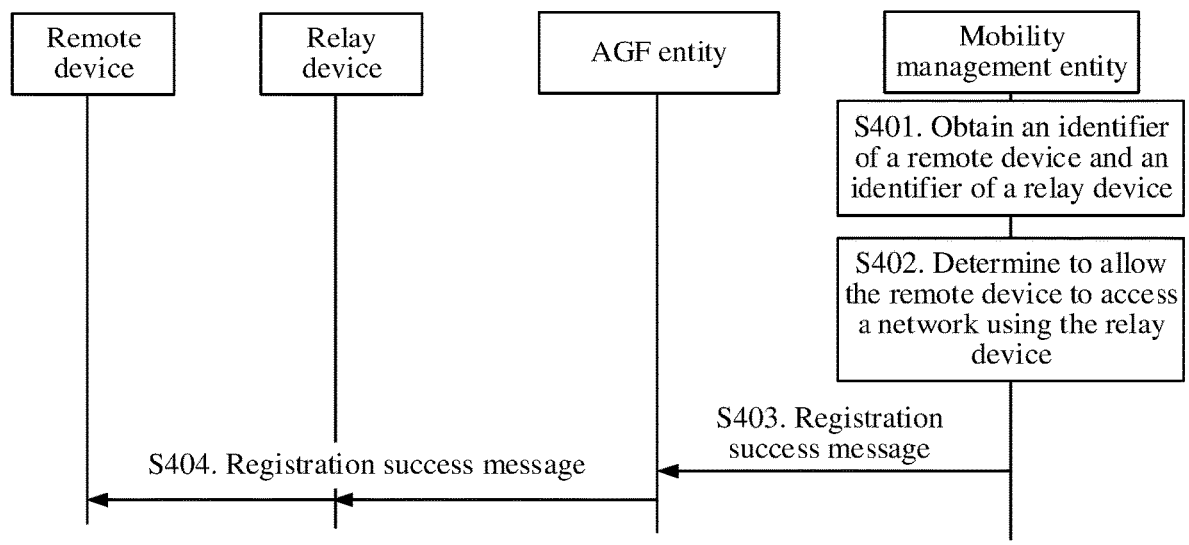
FIG. 4 is a schematic flowchart of a device access method according to a first embodiment of this application.

First, with reference to the device access system 10 shown in FIG. 1, FIG. 4 is a schematic flowchart of a device access method provided in a first embodiment of this application. Interaction between the mobility management entity 101, the AGF entity 102, the remote device, and the relay device includes the following steps.

Step S401: The mobility management entity obtains the identifier of the remote device and the identifier of the relay device.

Optionally, in this embodiment of this application, the identifier of the relay device may be, for example, at least one of the following identifiers of the relay device: a permanent identifier, a temporary identifier, a MAC address, an IP address, a line identifier, a second N2 interface temporary identifier allocated by the AGF entity to the relay device, a fourth N2 interface temporary identifier allocated by the AMF entity to the relay device, a user name, or a device identifier of another type. This is not limited in this embodiment of this application. A network side may identify the relay device based on the identifier of the relay device.

Optionally, the temporary identifier of the relay device may be, for example, a GUTI allocated by the network side to the relay device.

Optionally, the line identifier in this embodiment of this application may also be replaced with an access point identifier. A description is provided herein, and details are not described below again.

Optionally, in this embodiment of this application, the identifier of the remote device may be at least one of the following identifiers of the remote device: a permanent identifier, a temporary identifier, a MAC address, or an IP address. The permanent identifier of the remote device may be, for example, an IMSI of the remote device. The temporary identifier of the remote device may be, for example, a GUTI allocated by the network side to the remote device. This is not limited in this embodiment of this application.

Step S402: The mobility management entity determines, based on at least one of the identifier of the remote device and the identifier of the relay device, to allow the remote device to access a network using the relay device.

Step S403: The mobility management entity sends a registration success message to the AGF entity such that the AGF entity receives the registration success message from the mobility management entity.

Step S404: The AGF entity sends the registration success message to the remote device using the relay device such that the remote device receives the registration success message from the AGF entity.

A specific implementation of the steps S401 to S404 is described in detail in the following embodiments, and is not described herein.

In the device access method provided in this embodiment of this application, the mobility management entity may obtain the identifier of the remote device and the identifier of the relay device. That is, the mobility management entity may identify the remote device and the relay device, and further determine, based on at least one of the identifier of the remote device and the identifier of the relay device, to allow the remote device to access the network using the relay device. Therefore, the remote device may access the network using the relay device in this solution.

The actions of the mobility management entity in the foregoing steps S401, S402, and S403 may be performed by the processor 301 in the communications device 300 shown in FIG. 3 by invoking the application program code stored in the memory 303. This is not limited in this embodiment of this application.

The actions of the AGF entity in the steps S403 and S404 may be performed by the processor 301 in the communications device 300 shown in FIG. 3 by invoking the application program code stored in the memory 303. This is not limited in this embodiment of this application.

With reference to an example in which the device access system 10 shown in FIG. 1 is applied to the 5G network supporting fixed network access shown in FIG. 2, the device access method shown in FIG. 4 is described in detail.

Figure 5:
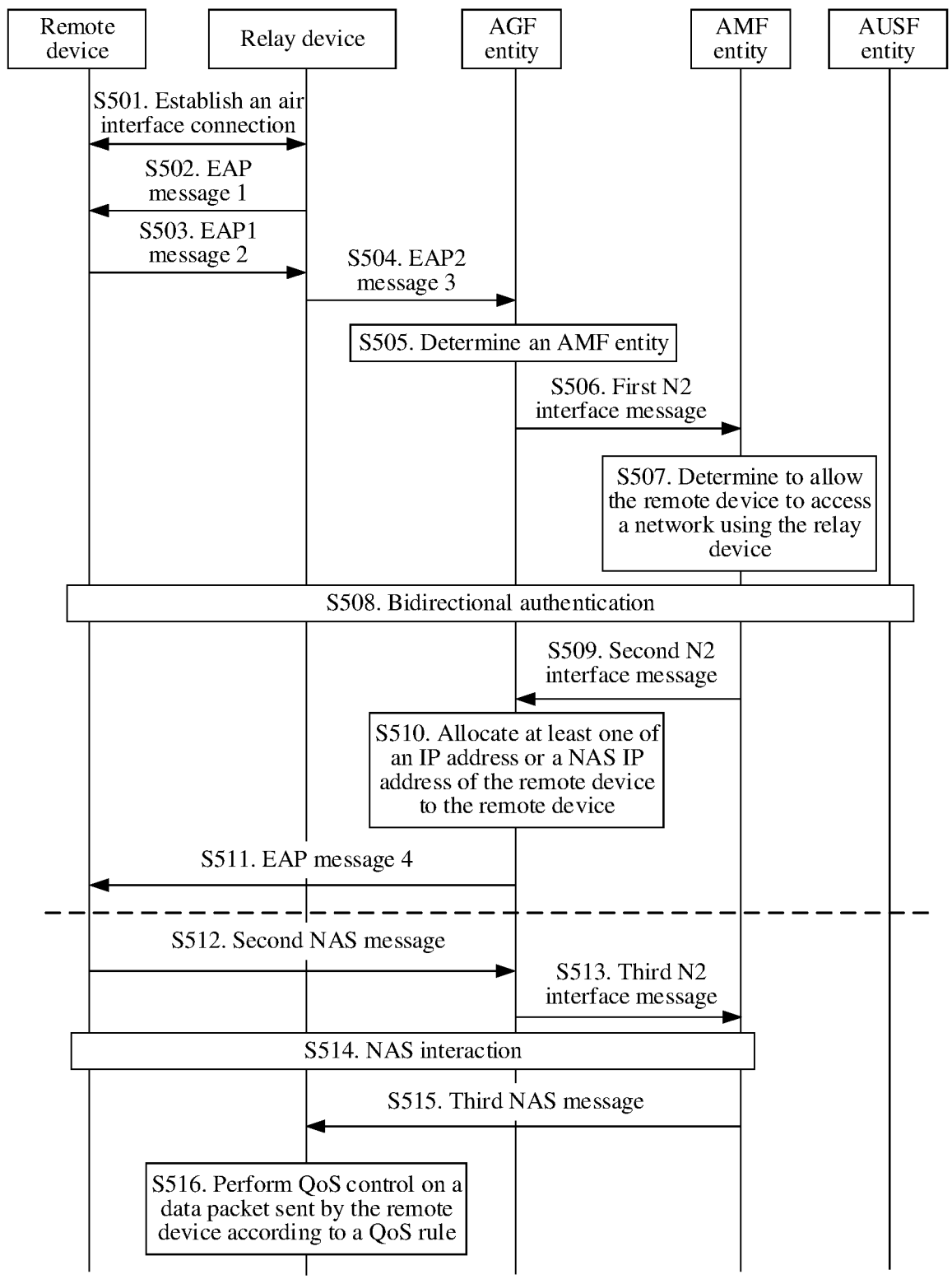
FIG. 5 is a schematic flowchart of a device access method according to a second embodiment of this application.

FIG. 5 is a schematic flowchart of a device access method according to a second embodiment of this application. The device access method includes the following steps.

Step S501: The remote device establishes an air interface connection to the relay device.

Optionally, the air interface connection in this embodiment of this application may be an 802.11-based WI-FI air interface connection, a BLUETOOTH connection, another wireless technology connection, or the like. This is not limited in this embodiment of this application.

Step S502: The relay device sends an Extensible Authentication Protocol (EAP) message 1 to the remote device such that the remote device receives the EAP message 1 from the relay device.

Optionally, the EAP message 1 in this embodiment of this application may be an EAP request message.

Optionally, the EAP message 1 in this embodiment of this application includes the identifier (identity) of the relay device. For the description of the identifier of the relay device, refer to the embodiment shown in FIG. 4. Details are not described herein again.

Step S503. The remote device sends an EAP message 2 to the relay device such that the relay device receives the EAP message 2 from the remote device. The EAP message 2 includes the identifier of the remote device and a first NAS message.

Optionally, the EAP message 2 in this embodiment of this application may be an EAP response message 1.

Optionally, the first NAS message in this embodiment of this application may be a registration request message, including the identifier of the remote device, a registration type identifier, and the like. For the description about the identifier of the remote device, refer to the embodiment shown in FIG. 4. Details are not described herein again.

Optionally, if the EAP message 1 in step S502 includes the identifier of the relay device, the EAP message 2 and the first NAS message may further include the identifier of the relay device.

Optionally, a layer 2 (L2) source MAC address of the EAP message 2 may be set to the MAC address of the remote device. Further, after receiving the EAP message 2, the relay device may identify the remote device based on the L2 source MAC address of the EAP message 2.

Certainly, after receiving the EAP message 2, the relay device may alternatively identify the remote device based on the identifier of the remote device included in the EAP message 2. This is not limited in this embodiment of this application.

Step S504: The relay device sends an EAP message 3 to the AGF entity such that the AGF entity receives the EAP message 3 from the relay device. The EAP message 3 includes the identifier of the remote device and the first NAS message.

Optionally, the EAP message 3 in this embodiment of this application may be an EAP response message 2.

Optionally, an L2 source MAC address of the EAP message 3 may be set to the MAC address of the remote device. Further, the AGF entity may identify the remote device based on the L2 source MAC address of the EAP message 3.

Alternatively, optionally, the AGF entity may identify the remote device based on the identifier of the remote device included in the EAP message 3. This is not limited in this embodiment of this application.

Optionally, the relay device may change the L2 source MAC address of the received EAP message 2 from the MAC address of the remote device to the MAC address of the relay device. That is, the relay device re-encapsulates the EAP response message based on the MAC address of the relay device to obtain the EAP message 3, and sends the EAP message 3 to the AGF entity. After receiving the EAP message 3, the AGF entity may further identify the relay device based on the L2 source MAC address of the EAP message 3.

Alternatively, optionally, the EAP message 3 may include the identifier of the relay device. After receiving the EAP message 3, the AGF entity may identify the relay device based on the identifier of the relay device. This is not limited in this embodiment of this application.

Step S505: The AGF entity determines the AMF entity.

Optionally, in this embodiment of this application, after identifying the relay device, the AGF entity may determine, based on the identifier of the relay device, an AMF entity corresponding to the remote device.

Optionally, in this embodiment of this application, the AGF entity may determine, based on the identifier of the relay device, the AMF entity corresponding to the remote device in the following manner.

The AGF entity determines, based on the identifier of the relay device, whether the AGF entity stores a context of the relay device. If the AGF entity stores the context of the relay device, that is, the relay device is in connected mode, the AGF entity determines that an AMF entity corresponding to an AMF identifier in the context of the relay device is the AMF entity corresponding to the remote device. If the AGF entity does not store the context of the relay device, the AGF entity may select, based on the identifier of the remote device or a local policy, the AMF entity corresponding to the remote device. This is not limited in this embodiment of this application.

Optionally, in this embodiment of this application, after identifying the remote device and the relay device, the AGF entity may establish a binding relationship between the remote device and the relay device based on the identifier of the remote device and the identifier of the relay device. In this way, in a subsequent process, after identifying the remote device, the AGF entity may communicate with the remote device using the relay device according to the binding relationship between the remote device and the relay device. This is not limited in this embodiment of this application.

Step S506: The AGF entity sends a first N2 interface message to the AMF entity such that the AMF entity receives the first N2 interface message from the AGF entity.

The first N2 interface message in this embodiment of this application may be an initial device request message, and includes a first N2 interface temporary identifier allocated by the AGF entity to the remote device and the first NAS message sent by the remote device. That is, after identifying the remote device, the AGF entity may initiate an N2 interface connection establishment procedure for the remote device, to be specific, the AGF entity sends the initial device request message to the AMF entity.

The AMF entity in step S506 and the subsequent steps S507 to S516 is the AMF entity determined in step S505. A description is provided herein, and details are not described below again.

Optionally, if the first NAS message does not include the identifier of the relay device, the first N2 interface message further includes the identifier of the relay device. In this case, the identifier of the relay device is obtained from the EAP message 3. This is not limited in this embodiment of this application.

Optionally, after identifying the remote device, the AGF entity may further establish a context related to the remote device, for example, establish a correspondence between the remote device and the AMF entity corresponding to the remote device. This is not limited in this embodiment of this application.

Step S507: The AMF entity parses the first NAS message included in the first N2 interface message to obtain the identifier of the remote device, and determines, based on at least one of the identifier of the remote device and the identifier of the relay device, to allow the remote device to access the network using the relay device.

If the first NAS message includes the identifier of the relay device, the identifier of the relay device is obtained after the AMF entity parses the first NAS message included in the first N2 interface message. If the first NAS message does not include the identifier of the relay device, the identifier of the relay device is obtained from the first N2 interface message. This is not limited in this embodiment of this application.

In one possible implementation, that the AMF entity determines, based on at least one of the identifier of the remote device and the identifier of the relay device, to allow the remote device to access the network using the relay device includes obtaining, by the AMF entity, context information or subscription data of the relay device based on the identifier of the relay device, further, determining, by the AMF entity based on the context information or the subscription data of the relay device, that the relay device allows the remote device to access the network using the relay device, obtaining, by the AMF entity, subscription data of the remote device based on the identifier of the remote device, and determining, by the AMF entity based on the subscription data of the remote device, that the remote device is allowed to access the network using the relay device.

Alternatively, in one possible implementation, that the AMF entity determines, based on at least one of the identifier of the remote device and the identifier of the relay device, to allow the remote device to access the network using the relay device includes obtaining, by the AMF entity, context information of the relay device based on the identifier of the relay device, further, determining, by the AMF entity based on the context information of the relay device, that an access point at which the relay device is currently located allows the remote device to access the network using the access point, obtaining, by the AMF entity, subscription data of the remote device based on the identifier of the remote device, and determining, by the AMF entity based on the subscription data of the remote device, that an access point at which the remote device is currently located allows the remote device to access the network.

That is, in the foregoing two implementations, capabilities of both the remote device and the relay device need to be verified. The remote device is allowed to access the network using the relay device only when the capabilities of both the remote device and the relay device support.

In one possible implementation, that the AMF entity determines, based on at least one of the identifier of the remote device and the identifier of the relay device, to allow the remote device to access the network using the relay device includes obtaining, by the AMF entity, context information or subscription data of the relay device based on the identifier of the relay device, determining, by the AMF entity based on the context information or the subscription data of the relay device, to allow the remote device to access the network using the relay device, or determining, by the AMF entity based on the context information of the relay device, that an access point at which the relay device is currently located allows the remote device to access the network using the access point.

That is, in this implementation, it is considered that the remote device is allowed to access the network using the relay device. In this case, only a capability of the relay device or an access point at which the relay device is currently located needs to be verified. When the capability of the relay device or the access point at which the relay device is currently located supports, the remote device is allowed to access the network using the relay device.

In one possible implementation, that the AMF entity determines, based on at least one of the identifier of the remote device and the identifier of the relay device, to allow the remote device to access the network using the relay device includes obtaining, by the AMF entity, subscription data of the remote device based on the identifier of the remote device, determining, by the AMF entity based on the subscription data of the remote device, to allow the remote device to access the network using the relay device, or determining, by the AMF entity based on the subscription data of the remote device, that an access point at which the remote device is currently located allows the remote device to access the network.

That is, in this implementation, it is considered that the relay device allows the remote device to access the network using the relay device. In this case, only a capability of the remote device or the access point at which the remote device is currently located needs to be verified. When the capability of the remote device or the access point at which the remote device is currently located supports, the remote device is allowed to access the network using the relay device.

Optionally, in this embodiment of this application, if the AMF entity determines, based on the context information of the relay device or the subscription data of the remote device, that the remote device is not allowed to access the network using the relay device, the AMF entity rejects a registration request of the remote device. The procedure ends. This is not limited in this embodiment of this application.

Optionally, in this embodiment of this application, after obtaining the identifier of the remote device and the identifier of the relay device, the AMF entity may further establish the binding relationship between the remote device and the relay device based on the identifier of the remote device and the identifier of the relay device. In this way, the AMF entity may subsequently send, to the relay device according to the correspondence, a QoS rule corresponding to the remote device such that the relay device controls, according to the QoS rule, a data packet sent by the remote device. This is not limited in this embodiment of this application.

Step S508: The network side and the remote device complete bidirectional authentication. For specific implementation, refer to the other approaches, and details are not described herein.

Step S509: If authentication on the remote device succeeds, the AMF entity sends a second N2 interface message to the AGF entity such that the AGF entity receives the second N2 interface message from the AMF entity.

The second N2 interface message includes at least one of a registration success message, a first N2 interface temporary identifier allocated by the AGF entity to the remote device, or a third N2 interface temporary identifier allocated by the AMF entity to the remote device. In this way, after receiving the second N2 interface message, the AGF entity may identify the remote device based on at least one of the first N2 interface temporary identifier allocated by the AGF entity to the remote device or the third N2 interface temporary identifier allocated by the AMF entity to the remote device.

Step S510: The AGF entity allocates at least one of an IP address or a NAS IP address of the remote device to the remote device.

In this way, when the NAS message is sent in the subsequent process, a local IP address of the remote device may be used as a source IP address, and the NAS IP address may be used as a destination IP address to encapsulate the NAS message. The NAS IP address is used to identify the NAS message. The IP address of the remote device is used to identify the remote device. A description is provided herein, and details are not described below again.

When only the NAS IP address or the local IP address of the remote device is allocated to the remote device, the NAS IP address or the local IP address of the remote device may be used to identify both the remote device and the NAS message. For example, different NAS IP addresses may be allocated to different remote devices. In this case, the NAS IP address may be used to identify both the remote device and the NAS message.

Optionally, in this embodiment of this application, the NAS IP address may be a local IP address of the AGF entity or an IP address of the AMF entity. This is not limited in this embodiment of this application.

Step S511: The AGF entity sends an EAP message 4 to the remote device using the relay device such that the remote device receives the EAP message 4 from the AGF entity.

The EAP message 4 includes at least one of the registration success message and the local IP address or the NAS IP address of the remote device.

Optionally, the EAP message 4 in this embodiment of this application may be an EAP success message.

Optionally, in this embodiment of this application, the MAC address of the remote device may be used as an L2 destination MAC address to encapsulate the EAP message 4.

After identifying the remote device, the AGF entity may determine the relay device according to the pre-established binding relationship between the remote device and the relay device, and further send the EAP message 4 to the relay device. After receiving the EAP message 4 from the AGF entity, the relay device may identify the remote device based on the L2 destination MAC address of the EAP message 4, and further send the EAP message 4 to the remote device.

Optionally, after receiving the EAP message 4 from the AGF entity, the relay device may further establish a correspondence between the MAC address of the remote device and the at least one of the local IP address or the NAS IP address of the remote device. In this way, in a subsequent NAS procedure, after receiving the NAS message that is from the remote device and encapsulated using the local IP address of the remote device as the source IP address and the NAS IP address as the destination IP address, the relay device may identify the remote device according to the correspondence. This is not limited in this embodiment of this application.

Optionally, the EAP message 4 may also include the identifier of the remote device. After receiving the EAP message 4 from the AGF entity, the relay device may further establish a correspondence between the identifier of the remote device and the at least one of the local IP address or the NAS IP address of the remote device. In this way, in a subsequent NAS procedure, after receiving the NAS message that is from the remote device and encapsulated using the local IP address of the remote device as the source IP address and the NAS IP address as the destination IP address, the relay device may identify the remote device according to the correspondence. This is not limited in this embodiment of this application.

Optionally, in this embodiment of this application, the remote device may further send a Dynamic Host Configuration Protocol (DHCP) request message to the AGF entity. The DHCP request message is used to request an IP address. After allocating the at least one of the local IP address or the NAS IP address of the remote device to the remote device, the AGF entity may further send a DHCP response message to the remote device using the relay device. The local IP address of the remote device may be carried in a specific IP address parameter in the DHCP response message. The NAS IP address may be carried in a server IP address parameter in the DHCP response message. This is not limited in this embodiment of this application.

The remote device may learn that the remote device is successfully registered, and an access procedure of the remote device ends.

In the device access method provided in this embodiment of this application, the AMF entity may obtain the identifier of the remote device and the identifier of the relay device. That is, the AMF entity may identify the remote device and the relay device, and further determine, based on the at least one of the identifier of the remote device and the identifier of the relay device, to allow the remote device to access the network using the relay device. Therefore, the remote device may access the network using the relay device in this solution.

Optionally, as shown in FIG. 5, after receiving the EAP message 4 from the AGF entity, the remote device may learn that the remote device is successfully registered, and may initiate a subsequent packet data unit (PDU) session procedure. The procedure includes the following steps.

Step S512: The remote device sends a second NAS message to the AGF entity using the relay device such that the AGF entity receives the second NAS message from the remote device.

The remote device may encapsulate the second NAS message using the local IP address of the remote device as the source IP address and using the NAS IP address as the destination IP address. In this way, after receiving the second NAS message, the AGF entity may identify the remote device based on the local IP address of the remote device, and identify, based on the NAS IP address, that the NAS message is encapsulated in the data packet.

Optionally, the second NAS message in this embodiment of this application may be a PDU session establishment request message.

Step S513: The AGF entity sends a third N2 interface message to the AMF entity such that the AMF entity receives the third N2 interface message from the AGF entity.

Optionally, the third N2 interface message in this embodiment of this application may be an N2 interface upstream NAS transmission message, including at least one of the second NAS message, the first N2 interface temporary identifier allocated by the AGF entity to the remote device, or a third N2 interface temporary identifier allocated by the AMF entity to the remote device. In this way, after receiving the third N2 interface message, the AMF entity may identify the remote device based on the at least one of the first N2 interface temporary identifier allocated by the AGF entity to the remote device or the third N2 interface temporary identifier allocated by the AMF entity to the remote device.

Step S514: The AMF entity interacts with the remote device based on the NAS. For specific implementation, refer to the other approaches, and details are not described herein.

In the steps S512 to S514, a PDU session establishment procedure after the remote device accesses the network using the relay device may be completed.

Optionally, as shown in FIG. 5, if the AMF entity establishes the binding relationship between the remote device and the relay device in the access procedure of the remote device, the AMF entity may further initiate QoS control according to the binding relationship in the PDU session procedure. The procedure includes the following steps.

Step S515: The AMF entity sends a third NAS message to the relay device such that the relay device receives the third NAS message from the AMF entity.

The third NAS message includes a QoS rule corresponding to a service flow of the remote device. The QoS rule may include data flow description information and a QoS parameter.

Step S516: The relay device performs, according to the QoS rule, QoS control on a data packet sent by the remote device.

Further, that the relay device performs, according to the QoS rule, QoS control on a data packet sent by the remote device may include parsing, by the relay device, an IP header of the received data packet of the remote device to obtain flow description information of a target data packet. Further, the relay device matches the flow description information of the target data packet with data flow description information in the QoS rule. If the matching succeeds, for example, the flow description information of the target data packet is the same as first data flow description information in the QoS rule, the relay device may perform QoS control on the data packet using a QoS parameter that is in the QoS rule and that is corresponding to the first data flow description information.

Certainly, the relay device may further perform, in another manner, QoS control on the data packet sent by the remote device. This is not limited in this embodiment of this application.

In the steps S515 and S516, the relay device may perform QoS control on the data packet sent by the remote device.

The actions of the AMF entity in the steps S506, S507, S508, S509, S513, S514, and S515 may be performed by the processor 301 in the communications device 300 shown in FIG. 3 by invoking the application program code stored in the memory 303. This is not limited in this embodiment of this application.

The actions of the AGF entity in the steps S504, S505, S506, S508, S509, S510, S511, S512, S513, and S514 may be performed by the processor 301 in the communications device 300 shown in FIG. 3 by invoking the application program code stored in the memory 303. This is not limited in this embodiment of this application.

Figure 6:
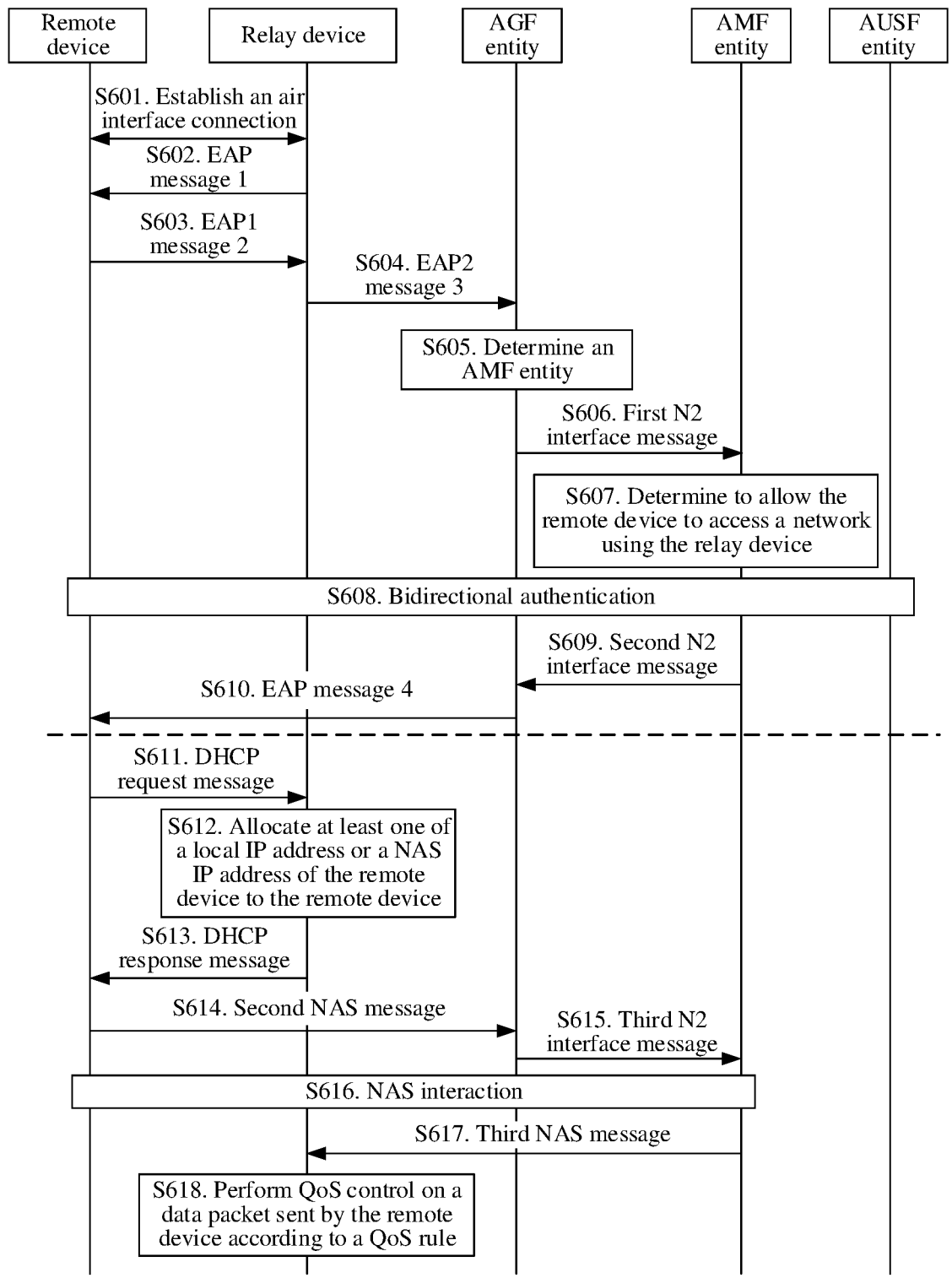
FIG. 6 is a schematic flowchart of a device access method according to a third embodiment of this application.

Optionally, FIG. 6 is a schematic flowchart of a device access method according to a third embodiment of this application. The device access method includes the following steps.

Steps S601 to S609 are the same as the steps S501 to S509. For details, refer to the embodiment shown in FIG. 5. Details are not described herein again.

Step S610: The AGF entity sends an EAP message 4 to the remote device using the relay device such that the remote device receives the EAP message 4 from the AGF entity.

The EAP message 4 may include a registration success message.

Optionally, in this embodiment of this application, the MAC address of the remote device may be used as an L2 destination MAC address to encapsulate the EAP message 4.

After identifying the remote device, the AGF entity may determine the relay device according to the pre-established binding relationship between the remote device and the relay device, and further send the EAP message 4 to the relay device. After receiving the EAP message 4 from the AGF entity, the relay device may identify the remote device based on the L2 destination MAC address of the EAP message 4, and further send the EAP message 4 to the remote device.

The remote device may learn that the remote device is successfully registered, and an access procedure of the remote device ends.

In the device access method provided in this embodiment of this application, the AMF entity may obtain the identifier of the remote device and the identifier of the relay device. That is, the AMF entity may identify the remote device and the relay device, and further determine, based on the at least one of the identifier of the remote device and the identifier of the relay device, to allow the remote device to access the network using the relay device. Therefore, the remote device may access the network using the relay device in this solution.

Optionally, as shown in FIG. 6, after receiving the EAP message 4 from the AGF entity, the remote device may learn that the remote device is successfully registered, and may initiate a subsequent PDU session procedure. The procedure includes the following steps.

Step S611: The remote device sends a DHCP request message to the relay device such that the relay device receives the DHCP request message from the remote device. The DHCP request message is used to request an IP address.

Optionally, an L2 source MAC address of the DHCP request message may be set to the MAC address of the remote device. Further, after receiving the DHCP request message, the relay device may identify the remote device based on the source L2 MAC address of the DHCP request message.

Alternatively, optionally, the DHCP request message may include the identifier of the remote device. Further, after receiving the DHCP request message, the relay device may identify the remote device based on the identifier of the remote device. For the related description of the identifier of the remote device, refer to the step S503. Details are not described herein again.

Step S612: The relay device allocates at least one of a local IP address or a NAS IP address of the remote device to the remote device.

For the related description of the step S612, refer to the step S510. Details are not described herein again.

Optionally, after allocating the at least one of the local IP address or the NAS IP address of the remote device to the remote device, the relay device may further establish a correspondence between the identifier of the remote device and the at least one of the local IP address or the NAS IP address of the remote device. In this way, in a subsequent NAS procedure, after receiving the NAS message that is from the remote device and encapsulated using the local IP address of the remote device as the source IP address and the NAS IP address as the destination IP address, the relay device may identify the remote device according to the correspondence. This is not limited in this embodiment of this application.

Step S613: The relay device sends a DHCP response message to the remote device such that the remote device receives the DHCP response message from the relay device.

The DHCP response message includes the at least one of the local IP address or the NAS IP address of the remote device.

The local IP address of the remote device may be carried in a specific IP address parameter in the DHCP response message. The NAS IP address may be carried in a server IP address parameter in the DHCP response message. This is not limited in this embodiment of this application.

Steps S614 to S616 are the same as the steps S512 to S514. For details, refer to the embodiment shown in FIG. 5. Details are not described herein again.

Optionally, as shown in FIG. 6, if the AMF entity establishes the binding relationship between the remote device and the relay device in the access procedure of the remote device, the AMF entity may further initiate QoS control according to the binding relationship in the PDU session procedure. The procedure includes the following steps.

Steps S617 and S618 are the same as the steps S515 and S516. For details, refer to the embodiment shown in FIG. 5. Details are not described herein again.

In the steps S617 and S618, the relay device may perform QoS control on the data packet sent by the remote device.

The actions of the AMF entity in the steps S606, S607, S608, S609, S615, S616, and S617 may be performed by the processor 301 in the communications device 300 shown in FIG. 3 by invoking the application program code stored in the memory 303. This is not limited in this embodiment of this application.

The actions of the AGF entity in the steps S604, S605, S606, S608, S609, S610, S614, S615, and S616 may be performed by the processor 301 in the communications device 300 shown in FIG. 3 by invoking the application program code stored in the memory 303. This is not limited in this embodiment of this application.

Figure 7:
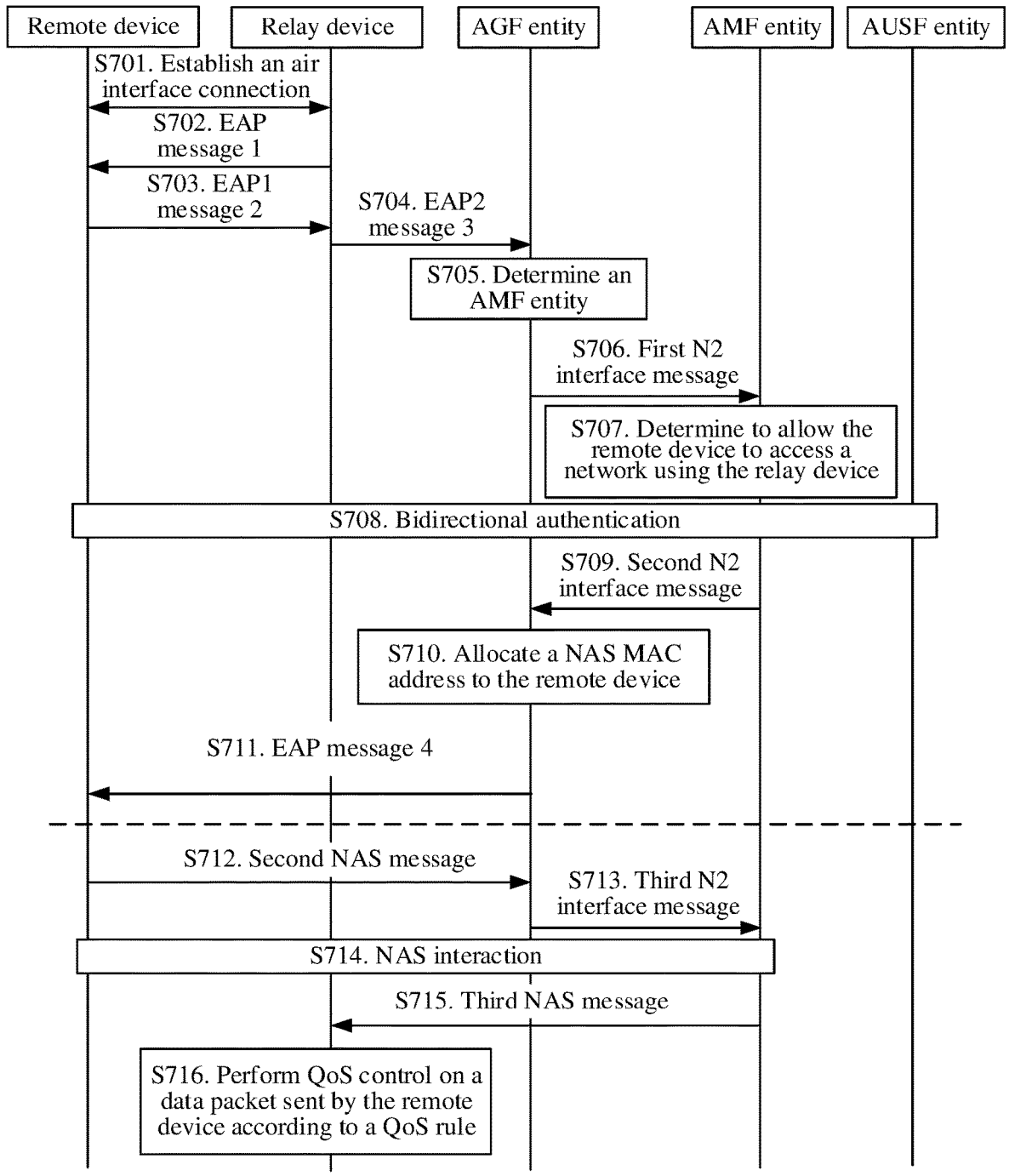
FIG. 7 is a schematic flowchart of a device access method according to a fourth embodiment of this application.

Optionally, FIG. 7 is a schematic flowchart of a device access method according to a fourth embodiment of this application. The device access method includes the following steps.

Steps S701 to S708 are the same as the steps S501 to S508. For details, refer to the embodiment shown in FIG. 5. Details are not described herein again.

Step S709: If authentication on the remote device succeeds, the AMF entity sends a second N2 interface message to the AGF entity such that the AGF entity receives the second N2 interface message from the AMF entity.

If the identifier of the remote device in this embodiment of this application includes the MAC address of the remote device, the second N2 interface message may further include the MAC address of the remote device.

Step S710: The AGF entity allocates a NAS MAC address to the remote device.

In this way, when the NAS message is sent in the subsequent process, the NAS MAC address of the remote device may be used as a destination MAC address to encapsulate the NAS message. The NAS MAC address is used to identify the NAS message. A description is provided herein, and details are not described below again.

Optionally, if the AGF entity may obtain the MAC address of the remote device using the second N2 interface message, the AGF entity may further store a correspondence between the MAC address and the NAS MAC address of the remote device. In this way, when the AGF entity learns the MAC address of the remote device, the AGF entity may determine the corresponding NAS MAC address according to the correspondence. Alternatively, when the AGF entity learns the NAS MAC address, the AGF entity may identify the corresponding remote device according to the correspondence. This is not limited in this embodiment of this application.

Step S711: The AGF entity sends an EAP message 4 to the remote device using the relay device such that the remote device receives the EAP message 4 from the AGF entity.

The EAP message 4 may include a registration success message and the NAS MAC address.

Optionally, in this embodiment of this application, the MAC address of the remote device may be used as an L2 destination MAC address to encapsulate the EAP message 4.

After identifying the remote device, the AGF entity may determine the relay device according to the pre-established binding relationship between the remote device and the relay device, and further send the EAP message 4 to the relay device. After receiving the EAP message 4 from the AGF entity, the relay device may identify the remote device based on the L2 destination MAC address of the EAP message 4, and further send the EAP message 4 to the remote device.

The remote device may learn that the remote device is successfully registered, and an access procedure of the remote device ends.

In the device access method provided in this embodiment of this application, the AMF entity may obtain the identifier of the remote device and the identifier of the relay device. That is, the AMF entity may identify the remote device and the relay device, and further determine, based on the at least one of the identifier of the remote device and the identifier of the relay device, to allow the remote device to access the network using the relay device. Therefore, the remote device may access the network using the relay device in this solution.

Optionally, as shown in FIG. 7, after receiving the EAP message 4 from the AGF entity, the remote device may learn that the remote device is successfully registered, and may initiate a subsequent PDU session procedure. The procedure includes the following steps.

Step S712: The remote device sends a second NAS message to the AGF entity using the relay device such that the AGF entity receives the second NAS message from the remote device.

The remote device may encapsulate the second NAS message using the MAC address of the remote device as an L2 source MAC address and using the NAS MAC address as the L2 destination MAC address. In this way, after receiving the second NAS message, the AGF entity may identify the remote device based on the MAC address of the remote device, and identify, based on the NAS MAC address, that the NAS message is encapsulated in the data packet.

Optionally, the second NAS message in this embodiment of this application may be a PDU session establishment request message.

Steps S713 and S714 are the same as the steps S513 and S514. For details, refer to the embodiment shown in FIG. 5. Details are not described herein again.

In the steps S712 to S714, a PDU session establishment procedure after the remote device accesses the network using the relay device may be completed.

Optionally, as shown in FIG. 7, if the AMF entity establishes the binding relationship between the remote device and the relay device in the access procedure of the remote device, the AMF entity may further initiate QoS control according to the binding relationship in the PDU session procedure. The procedure includes the following steps.

Steps S715 and S716 are the same as the steps S515 and S516. For details, refer to the embodiment shown in FIG. 5. Details are not described herein again.

In the steps S715 and S716, the relay device may perform QoS control on the data packet sent by the remote device.

The actions of the AMF entity in the steps S706, S707, S708, S709, S713, S714, and S715 may be performed by the processor 301 in the communications device 300 shown in FIG. 3 by invoking the application program code stored in the memory 303. This is not limited in this embodiment of this application.

The actions of the AGF entity in the steps S704, S705, S706, S708, S709, S710, S711, S712, S713, and S714 may be performed by the processor 301 in the communications device 300 shown in FIG. 3 by invoking the application program code stored in the memory 303. This is not limited in this embodiment of this application.

Figure 8:
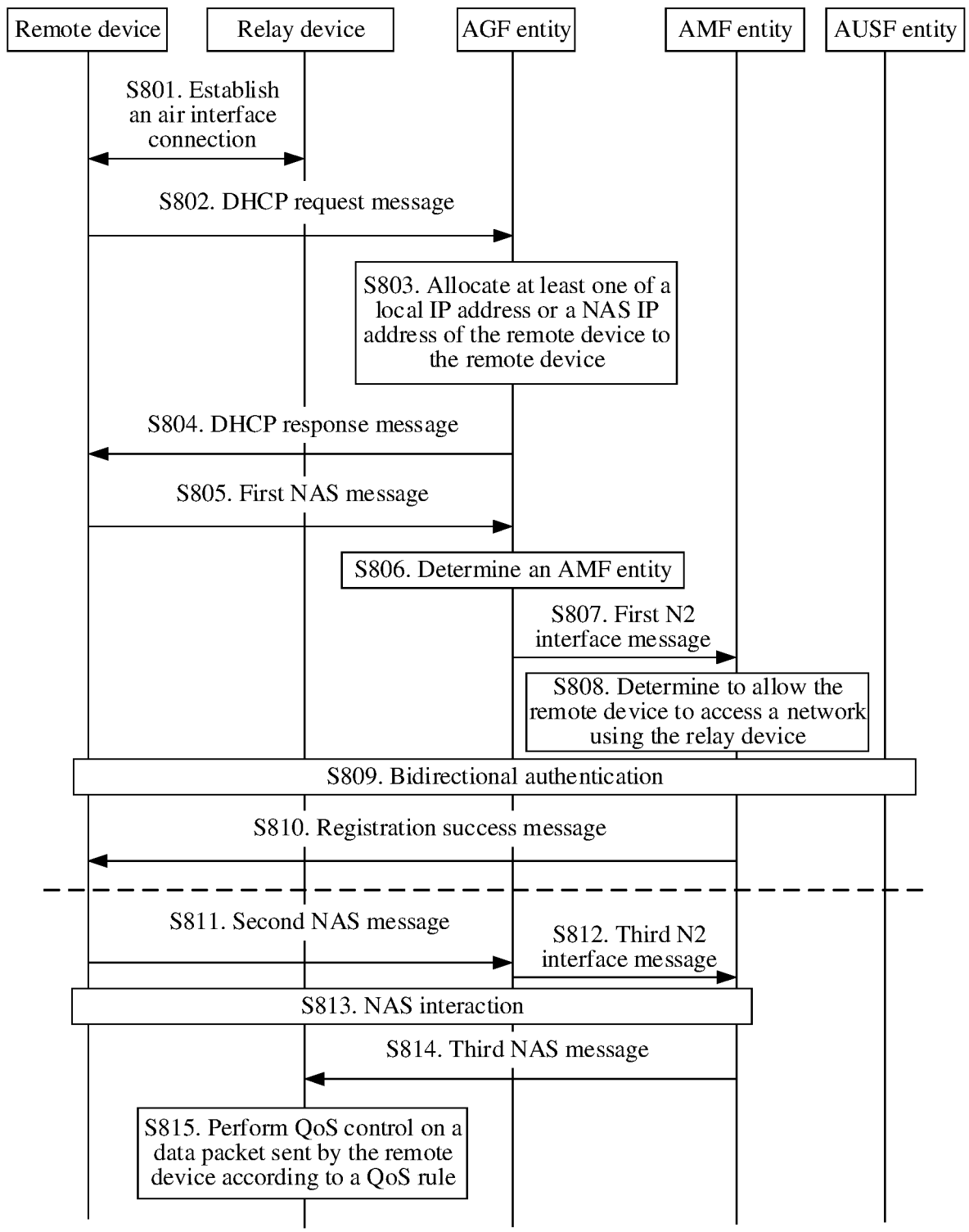
FIG. 8 is a schematic flowchart of a device access method according to a fifth embodiment of this application.

Optionally, FIG. 8 is a schematic flowchart of a device access method according to a fifth embodiment of this application. The device access method includes the following steps.

Step S801: The remote device establishes an air interface connection to the relay device.

For details, refer to S501. Details are not described herein again.

Step S802: The remote device sends a DHCP request message to the AGF entity using the relay device such that the AGF entity receives the DHCP request message from the remote device. The DHCP request message includes a line identifier (circuit ID), which is used to request an IP address.

Optionally, an L2 source MAC address of the DHCP request message may be set to the MAC address of the remote device. Further, after receiving the DHCP request message, the AGF entity may identify the remote device based on a source L2 MAC address of the DHCP request message.

Alternatively, optionally, the DHCP request message may include the identifier of the remote device. Further, after receiving the DHCP request message, the AGF entity may identify the remote device based on the identifier of the remote device. For the related description of the identifier of the remote terminal, refer to the step S503. Details are not described herein again.

Optionally, in this embodiment of this application, the AGF entity may identify the relay device based on the line identifier. For example, the AGF entity may determine a relay device that has a same line identifier as the remote device as a target relay device.

Step S803: The AGF entity allocates at least one of a local IP address or a NAS IP address of the remote device to the remote device.

For the related description of the step S803, refer to the step S510. Details are not described herein again.

After identifying the remote device and the relay device, the AGF entity may establish a binding relationship between the remote device and the relay device based on the identifier of the remote device and the identifier of the relay device. In this way, in a subsequent process, after identifying the remote device, the AGF entity may communicate with the remote device using the relay device according to the binding relationship between the remote device and the relay device. This is not further limited in this embodiment of this application.

Step S804: The AGF entity sends a DHCP response message to the remote device using the relay device such that the relay device receives the DHCP response message from the AGF entity.

The DHCP response message includes the at least one of the local IP address or the NAS IP address of the remote device.

Optionally, in this embodiment of this application, the MAC address of the remote device may be used as an L2 destination MAC address to encapsulate the DHCP response message. In this way, after receiving the DHCP response message from the AGF entity, the relay device may identify the remote device based on the L2 destination MAC address of the DHCP response message, and further send the DHCP response message to the remote device.

Optionally, after receiving the DHCP response message from the AGF entity, the relay device may further establish a correspondence between the MAC address of the remote device and the at least one of the local IP address or the NAS IP address of the remote device. In this way, in a subsequent NAS procedure, after receiving the NAS message that is from the remote device and encapsulated using the local IP address of the remote device as the source IP address and the NAS IP address as the destination IP address, the relay device may identify the remote device according to the correspondence. This is not limited in this embodiment of this application.

In the steps S801 to S804, the remote device may obtain an IP address required for encapsulating the NAS message in a subsequent process. The remote device may further initiate an access procedure of the remote device based on at least one of the local IP address or the NAS IP address of the remote device. The procedure includes the following steps.

Step S805: The remote device sends a first NAS message to the AGF entity using the relay device such that the AGF entity receives the first NAS message from the remote device.

The first NAS message in this embodiment of this application may be a registration request message, including the identifier of the remote device, a registration type identifier, and the like.

Optionally, in this embodiment of this application, the remote device encapsulates the first NAS message using the local IP address of the remote device as the source IP address and using the NAS IP address as the destination IP address. In this way, after receiving the first NAS message, the AGF entity may identify the remote device based on the local IP address of the remote device, and identify, based on the NAS IP address, that the NAS message is encapsulated in the data packet.

Step S806: The AGF entity determines an AMF entity.

Optionally, after identifying the remote device, the AGF entity may determine the relay device according to the pre-established binding relationship between the remote device and the relay device. If the AGF entity stores a context of the relay device, that is, the relay device is in connected mode, the AGF entity further determines that an AMF entity corresponding to an AMF identifier in the context of the relay device is the AMF entity corresponding to the remote device. If the AGF entity does not store the context of the relay device, the AGF entity may select, based on the identifier of the remote device or a local policy, the AMF entity corresponding to the remote device. This is not limited in this embodiment of this application.

Step S807: The AGF entity sends a first N2 interface message to the AMF entity such that the AMF entity receives the first N2 interface message from the AGF entity.

The first N2 interface message in this embodiment of this application may be an initial device request message, and includes a first N2 interface temporary identifier allocated by the AGF entity to the remote device, the line identify, and the first NAS message sent by the remote device. That is, after identifying the remote device, the AGF entity may initiate an N2 interface connection establishment procedure for the remote device, to be specific, the AGF entity sends the initial device request message to the AMF entity.

Optionally, after identifying the remote device, the AGF entity may further establish a context related to the remote device, for example, establish a correspondence between the remote device and a target AMF entity. This is not limited in this embodiment of this application.

Step S808: The AMF entity parses the first NAS message included in the first N2 interface message to obtain the identifier of the remote device, and determines, based on at least one of the identifier of the remote device and the identifier of the relay device, to allow the remote device to access the network using the relay device.

After parsing the first NAS message, the AMF entity may obtain the identifier of the remote device, to identify the remote device.

For specific implementation of determining, by the AMF entity based on the at least one of the identifier of the remote device and the identifier of the relay device, to allow the remote device to access the network using the relay device, refer to the step S507. Details are not described herein again.

The AMF entity may identify the relay device based on the line identifier. For example, the AMF entity may determine a relay device that has a same line identifier as the remote device as a target relay device.

Optionally, after obtaining the identifier of the remote device and the identifier of the relay device, the AMF entity may further establish the binding relationship between the remote device and the relay device based on the identifier of the remote device and the identifier of the relay device. In this way, the AMF entity may subsequently send, to the relay device according to the correspondence, a QoS rule corresponding to the remote device such that the relay device controls, according to the QoS rule, a data packet sent by the remote device. This is not limited in this embodiment of this application.

Step S809: The network side and the remote device complete bidirectional authentication. For specific implementation, refer to the other approaches, and details are not described herein.

Step S810: If authentication on the remote device succeeds, the AMF entity sends a registration success message to the remote device such that the remote device receives the registration success message from the AMF entity.

The remote device may learn that the remote device is successfully registered, and an access procedure of the remote device ends.

In the device access method provided in this embodiment of this application, the AMF entity may obtain the identifier of the remote device and the identifier of the relay device. That is, the AMF entity may identify the remote device and the relay device, and further determine, based on the at least one of the identifier of the remote device and the identifier of the relay device, to allow the remote device to access the network using the relay device. Therefore, the remote device may access the network using the relay device in this solution.

Optionally, as shown in FIG. 8, after receiving the EAP message 4 from the AGF entity, the remote device may learn that the remote device is successfully registered, and may initiate a subsequent PDU session procedure. The procedure includes the following steps.

Steps S811 to S813 are the same as the steps S512 to S514. For details, refer to the embodiment shown in FIG. 5. Details are not described herein again.

In the steps S811 to S813, a PDU session establishment procedure after the remote device accesses the network using the relay device may be completed.

Optionally, as shown in FIG. 8, if the AMF entity establishes the binding relationship between the remote device and the relay device in the access procedure of the remote device, the AMF entity may further initiate QoS control according to the binding relationship in the PDU session procedure. The procedure includes the following steps.

Steps S814 and S815 are the same as the steps S515 and S516. For details, refer to the embodiment shown in FIG. 5. Details are not described herein again.

In the steps S814 and S815, the relay device may perform QoS control on the data packet sent by the remote device.

The actions of the AMF entity in the steps S807, S808, S809, S810, S812, S813, and S814 may be performed by the processor 301 in the communications device 300 shown in FIG. 3 by invoking the application program code stored in the memory 303. This is not limited in this embodiment of this application.

The actions of the AGF entity in the steps S802, S803, S804, S805, S806, S807, S809, S811, S812, and S813 may be performed by the processor 301 in the communications device 300 shown in FIG. 3 by invoking the application program code stored in the memory 303. This is not limited in this embodiment of this application.

Figure 9:
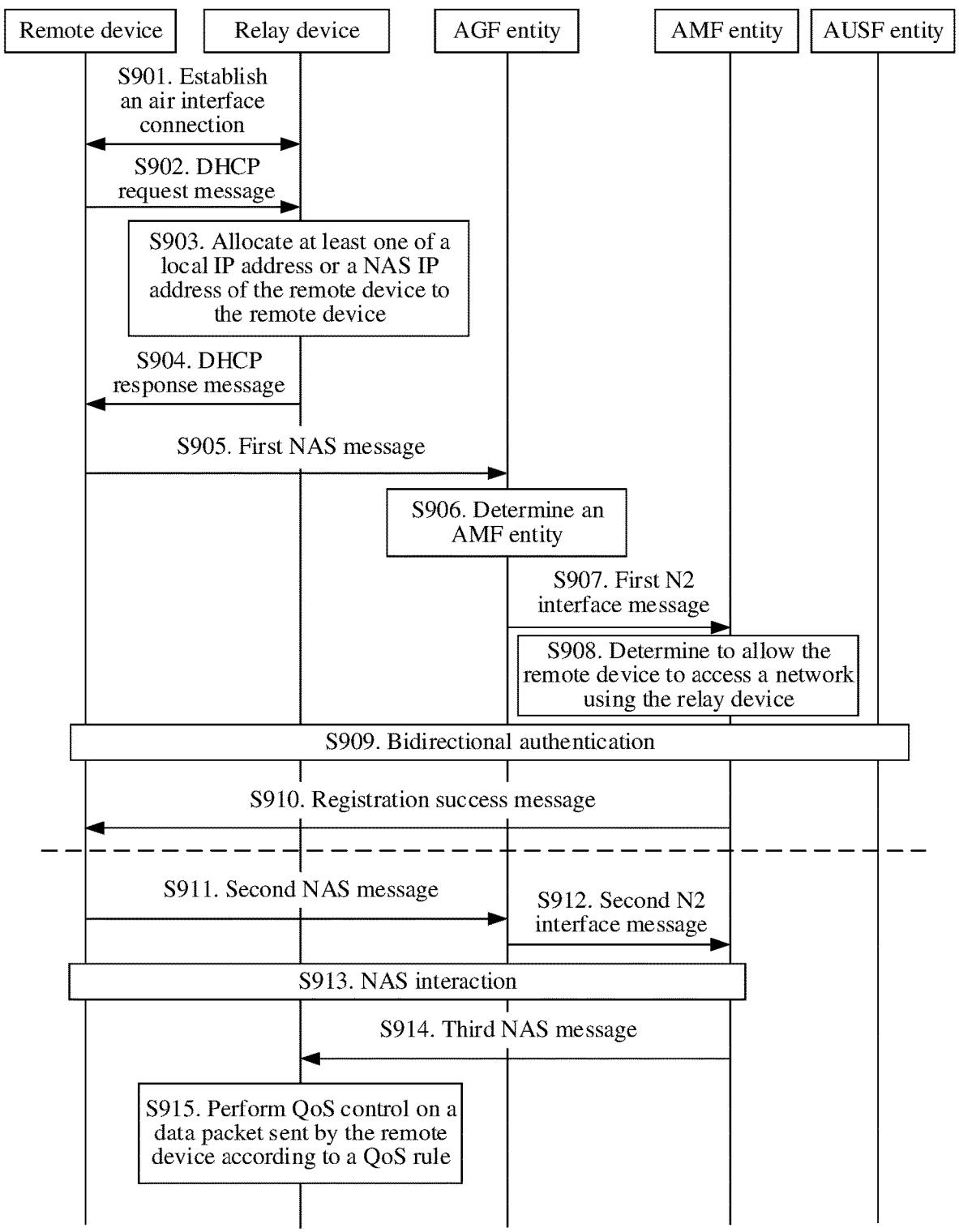
FIG. 9 is a schematic flowchart of a device access method according to a sixth embodiment of this application.

Optionally, FIG. 9 is a schematic flowchart of a device access method according to a sixth embodiment of this application. The device access method includes the following steps.

Step S901: The remote device establishes an air interface connection to the relay device.

For details, refer to step S501. Details are not described herein again.

Steps S902 to S904 are the same as the steps S611 to S613. For details, refer to the embodiment shown in FIG. 6. Details are not described herein again.

In the steps S902 to S904, the remote device may obtain an IP address required for encapsulating the NAS message in a subsequent process. The remote device may further initiate an access procedure of the remote device based on at least one of the local IP address or the NAS IP address of the remote device. The procedure includes the following steps.

Step S905: The remote device sends a first NAS message to the AGF entity using the relay device such that the AGF entity receives the first NAS message from the remote device.

The first NAS message in this embodiment of this application may be a registration request message, including the identifier of the remote device, a registration type identifier, and the like.

Optionally, in this embodiment of this application, the remote device may encapsulate the first NAS message using the local IP address of the remote device as the source IP address and using the NAS IP address as the destination IP address. In this way, after receiving the first NAS message, the AGF entity may identify the remote device based on the local IP address of the remote device, and identify, based on the NAS IP address, that the NAS message is encapsulated in the data packet.

Optionally, an IP header of the first NAS message in this embodiment of this application may further include a line identifier. In this way, after receiving the first NAS message from the remote device, the AGF entity may identify the relay device based on the line identifier. For example, the AGF entity may determine a relay device that has a same line identifier as the remote device as a target relay device. This is not limited in this embodiment of this application.

Step S906 is the same as the step S806. For details, refer to the embodiment shown in FIG. 8. Details are not described again herein.

Optionally, in this embodiment of this application, after identifying the remote device and the relay device, the AGF entity may establish a binding relationship between the remote device and the relay device based on the identifier of the remote device and the identifier of the relay device. In this way, in a subsequent process, after identifying the remote device, the AGF entity may communicate with the remote device using the relay device according to the binding relationship between the remote device and the relay device. This is not limited in this embodiment of this application.

Steps S907 to S910 are the same as the steps S807 to S810. For details, refer to the embodiment shown in FIG. 8. Details are not described again herein.

The remote device may learn that the remote device is successfully registered, and an access procedure of the remote device ends.

In the device access method provided in this embodiment of this application, the AMF entity may obtain the identifier of the remote device and the identifier of the relay device. That is, the AMF entity may identify the remote device and the relay device, and further determine, based on the at least one of the identifier of the remote device and the identifier of the relay device, to allow the remote device to access the network using the relay device. Therefore, the remote device may access the network using the relay device in this solution.

Optionally, as shown in FIG. 9, after receiving the EAP message 4 from the AGF entity, the remote device may learn that the remote device is successfully registered, and may initiate a subsequent PDU session procedure. The procedure includes the following steps.

Steps S911 to S913 are the same as the steps S512 to S514. For details, refer to the embodiment shown in FIG. 5. Details are not described herein again.

In the steps S911 to S913, a PDU session establishment procedure after the remote device accesses the network using the relay device may be completed.

Optionally, as shown in FIG. 9, if the AMF entity establishes the binding relationship between the remote device and the relay device in the access procedure of the remote device, the AMF entity may further initiate QoS control according to the binding relationship in the PDU session procedure. The procedure includes the following steps.

Steps S914 and S915 are the same as the steps S515 and S516. For details, refer to the embodiment shown in FIG. 5. Details are not described herein again.

In the steps S914 and S915, the relay device may perform QoS control on the data packet sent by the remote device.

The actions of the AMF entity in the steps S907, S908, S909, S910, S912, S913, and S914 may be performed by the processor 301 in the communications device 300 shown in FIG. 3 by invoking the application program code stored in the memory 303. This is not limited in this embodiment of this application.

The actions of the AMF entity in the steps S905, S906, S907, S909, S911, S912, and S913 may be performed by the processor 301 in the communications device 300 shown in FIG. 3 by invoking the application program code stored in the memory 303. This is not limited in this embodiment of this application.

The foregoing mainly describes the solutions provided in the embodiments of this application from a perspective of interaction between the network elements. It may be understood that the mobility management entity includes a corresponding hardware structure and/or software module for performing each function to implement the functions. A person skilled in the art should easily be aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A skilled person may use different methods to implement the described functions for each particular application, but it should not be considered that the implementation goes beyond the scope of this application.

In the embodiments of this application, the mobility management function entity may be divided into functional modules based on the foregoing method examples. For example, functional modules corresponding to various functions may be obtained through division, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in actual implementation.

Figure 10:
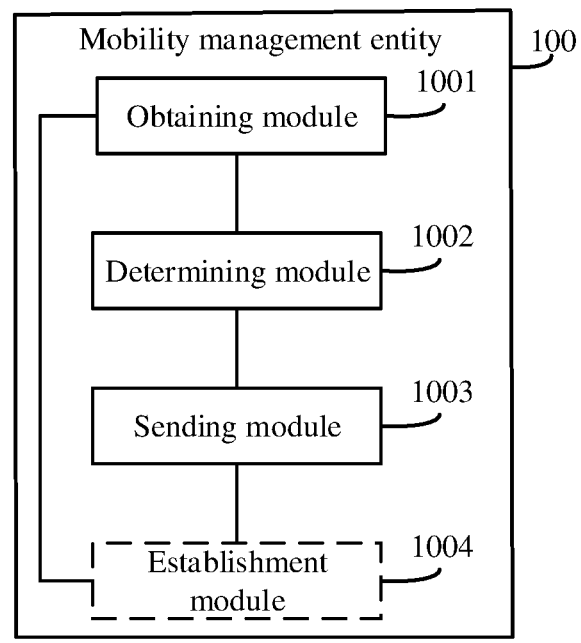
FIG. 10 is a schematic diagram of a structure of a mobility management entity according to a seventh embodiment of this application.

For example, when functional modules are divided by function, FIG. 10 shows a possible schematic diagram of a structure of the mobility management entity 100 in a seventh embodiment of this application. The mobility management entity 100 includes an obtaining module 1001, a determining module 1002, and a sending module 1003.

The obtaining module 1001 is configured to obtain an identifier of a remote device and an identifier of a relay device. The determining module 1002 is configured to determine, based on at least one of the identifier of the remote device and the identifier of the relay device, to allow the remote device to access a network using the relay device. The sending module 1003 is configured to send a registration success message to the remote device using the relay device. Optionally, the identifier of the relay device may be, for example, at least one of the following identifiers of the relay device: a permanent identifier, a temporary identifier, a MAC address, an IP address, a line identifier, a second N2 interface temporary identifier allocated by an AGF entity to the relay device, a fourth N2 interface temporary identifier allocated by an AMF entity to the relay device, a user name, or a device identifier of another type. This is not limited in this embodiment of this application. A network side may identify the relay device based on the identifier of the relay device.

Optionally, the identifier of the remote device may be at least one of the following identifiers of the remote device: a permanent identifier, a temporary identifier, a MAC address, or an IP address. The permanent identifier of the remote device may be, for example, an IMSI of the remote device. The temporary identifier of the remote device may be, for example, a GUTI allocated by the network side to the remote device. This is not limited in this embodiment of this application.

Optionally, the obtaining module 1001 is further configured to receive a first registration request message from the remote device, where the first registration request message includes the identifier of the remote device and the identifier of the relay device Alternatively, optionally, the obtaining module 1001 is further configured to receive a first message from an AGF entity, where the first message includes the identifier of the relay device and a second registration request message, and the second registration request message includes the identifier of the remote device.

Alternatively, optionally, the obtaining module 1001 is further configured to receive a second message from an AGF entity, where the second message includes a line identifier and a third registration request message, and the third registration request message includes the identifier of the remote device, and obtain the identifier of the relay device based on the line identifier.

Alternatively, optionally, the obtaining module 1001 is further configured to receive a fourth registration request message from an AGF entity, where the fourth registration request message includes the identifier of the remote device and a line identifier, and obtain the identifier of the relay device based on the line identifier.

Optionally, the determining module 1002 is further configured to obtain context information or subscription data of the relay device based on the identifier of the relay device, determine, based on the context information or the subscription data of the relay device, that the relay device allows the remote device to access the network using the relay device, obtain subscription data of the remote device based on the identifier of the remote device, and determine, based on the subscription data of the remote device, that the remote device is allowed to access the network using the relay device.

Alternatively, optionally, the determining module 1002 is further configured to obtain context information or subscription data of the relay device based on the identifier of the relay device, determine, based on the context information of the relay device, that an access point at which the relay device is currently located allows the remote device to access the network using the access point, obtain subscription data of the remote device based on the identifier of the remote device, and determine, based on the subscription data of the remote device, that an access point at which the remote device is currently located allows the remote device to access the network.

That is, in the foregoing two implementations, capabilities of both the remote device and the relay device need to be verified. The remote device is allowed to access the network using the relay device only when the capabilities of both the remote device and the relay device support.

Alternatively, optionally, the determining module 1002 is further configured to obtain context information or subscription data of the relay device based on the identifier of the relay device, determine, based on the context information or the subscription data of the relay device, to allow the remote device to access the network using the relay device, or determine, based on the context information of the relay device, that an access point at which the relay device is currently located allows the remote device to access the network using the access point. That is, in this implementation, it is considered that the remote device is allowed to access the network using the relay device. In this case, only a capability of the relay device or an access point at which the relay device is currently located needs to be verified. When the capability of the relay device or the access point at which the relay device is currently located supports, the remote device is allowed to access the network using the relay device.

Alternatively, optionally, the determining module 1002 is further configured to obtain subscription data of the remote device based on the identifier of the remote device, and determine, based on the subscription data of the remote device, to allow the remote device to access the network using the relay device, or determine, based on the subscription data of the remote device, that an access point at which the remote device is currently located allows the remote device to access the network. That is, in this implementation, it is considered that the relay device allows the remote device to access the network using the relay device. In this case, only a capability of the remote device or the access point at which the remote device is currently located needs to be verified. When the capability of the remote device or the access point at which the remote device is currently located supports, the remote device is allowed to access the network using the relay device.

Optionally, as shown in FIG. 10, the mobility management entity further includes an establishment module 1004.

The establishment module 1004 is configured to, after the obtaining module 1001 obtains the identifier of the remote device and the identifier of the relay device, establish a correspondence between the remote device and the relay device based on the identifier of the remote device and the identifier of the relay device. The sending module 1003 is further configured to after sending the registration success message to the remote device using the relay device, send, according to the correspondence, a QoS rule corresponding to a service flow of the remote device to the relay device, where the QoS rule is used to perform QoS control on a data packet sent by the remote device.

All related content of steps in the foregoing method embodiments may be cited in function descriptions of corresponding function modules, and details are not described herein again.

Figure 11:
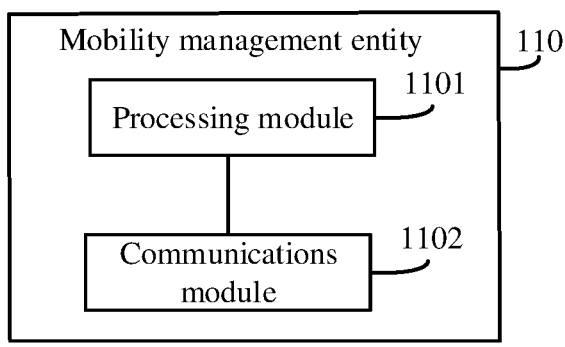
FIG. 11 is a schematic diagram of a structure of a mobility management entity according to an eighth embodiment of this application.

When the functional modules are obtained through division in an integrated manner, FIG. 11 is a schematic diagram of a possible structure of a mobility management entity 110 according to an eighth embodiment of this application. The mobility management entity 110 includes a processing module 1101 and a communications module 1102. The processing module 1101 may be configured to perform operations that can be performed by the obtaining module 1001 and the determining module 1002 in FIG. 10. Alternatively, the processing module 1101 may be configured to perform operations that can be performed by the obtaining module 1001, the determining module 1002, and the establishment module 1004 in FIG. 10. The communications module 1102 may be configured to perform operations that can be performed by the sending module 1003 in FIG. 10. For details, refer to the embodiment shown in FIG. 10. Details are not described herein again.

All related content of steps in the foregoing method embodiments may be cited in function descriptions of corresponding function modules, and details are not described herein again.

In this embodiment, the mobility management entity is presented in a form in which functional modules are divided by function, or the mobility management entity is presented in a form in which functional modules are divided in an integrated manner. The "module" herein may be an ASIC, a circuit, a processor and a memory that execute one or more software programs or firmware programs, an integrated logic circuit, and/or another component that can provide the foregoing function. In one simple embodiment, a person skilled in the art may figure out that the mobility management entity 100 or 110 may be in a form shown in FIG. 3. For example, the obtaining module 1001, the determining module 1002, and the sending module 1003 in FIG. 10 may be implemented using the processor 301 and the memory 303 in FIG. 3. Further, the obtaining module 1001, the determining module 1002, and the sending module 1003 may be implemented by the processor 301 by invoking application program code stored in the memory 303. This is not limited in this embodiment of this application. Alternatively, for example, the obtaining module 1001, the determining module 1002, the sending module 1003, and the establishment module 1004 in FIG. 10 may be implemented using the processor 301 and the memory 303 in FIG. 3. Further, the obtaining module 1001, the determining module 1002, the sending module 1003, and the establishment module 1004 may be implemented by the processor 301 by invoking the application program code stored in the memory 303. This is not limited in the embodiments of this application. Alternatively, the processing module 1101 and the communications module 1102 in FIG. 11 may be implemented using the processor 301 and the memory 303 in FIG. 3. Further, the processing module 1101 and the communications module 1102 may be implemented using the processor 301 to invoke the application program code stored in the memory 303. This is not limited in this embodiment of this application.

Because the mobility management entity provided in this embodiment of this application may be configured to perform the device access method, for a technical effect that can be obtained by the mobility management entity, refer to the foregoing method embodiments. Details are not described herein again.

Optionally, an embodiment of this application provides a chip system. The chip system includes a processor configured to support a mobility management entity to implement the functions in the foregoing aspects, for example, the mobility management entity determines, based on at least one of an identifier of a remote device or an identifier of a relay device, to allow the remote device to access a network using the relay device. In one possible design, the chip system further includes a memory. The memory is configured to store a program instruction and data required by the mobility management entity. The chip system may include a chip, or may include a chip and another discrete component. This is not limited in this embodiment of this application.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, apparently, various modifications and combinations may be made to this application without departing from the spirit and scope of this application. Correspondingly, the specification and accompanying drawings are merely example descriptions of this application defined by the accompanying claims, and are considered as any or all of modifications, variations, combinations, or equivalents that cover the scope of this application. Apparently, a person skilled in the art can make various modifications and variations to this application without departing from the spirit and scope of this application. In this way, this application is intended to cover these modifications and variations of this application provided that they fall within the scope of protection defined by the following claims and their equivalent technologies.

What is claimed is:

1. A device access method implemented by a mobility management entity, wherein the device access method comprises:

obtaining an identifier of a remote device and an identifier of a relay device;

determining, based on the identifier of the remote device or the identifier of the relay device, to allow the remote device to access a network using the relay device; and sending, in response to the determining, a registration success message to the remote device using the relay device, wherein determining to allow the remote device to access the network using the relay device comprises:

obtaining context information or subscription data of the relay device based on the identifier of the relay device; and either determining, based on the context information or the subscription data of the relay device, that the relay device allows the remote device to access the network using the relay device; or determining, based on the context information, that a first access point at which the relay device is currently located allows the remote device to access the network using the first access point;

obtaining subscription data of the remote device based on the identifier of the remote device; and either determining, based on the subscription data of the remote device, that the remote device is allowed to access the network using the relay device; or determining, based on the subscription data of the remote device, that a second access point at which the remote device is currently located allows the remote device to access the network;

obtaining the context information or the subscription data of the relay device based on the identifier of the relay device; and either determining, based on the context information or the subscription data of the relay device, to allow the remote device to access the network using the relay device; or determining, based on the context information, that the first access point allows the remote device to access the network using the first access point; or obtaining the subscription data of the remote device based on the identifier of the remote device; and either determining, based on the subscription data of the remote device, to allow the remote device to access the network using the relay device, or determining, based on the subscription data of the remote device, that the second access point allows the remote device to access the network.

2. The device access method of claim 1, wherein obtaining the identifier of the remote device and the identifier of the relay device comprises:

receiving a first registration request message from the remote device, wherein the first registration request message comprises the identifier of the remote device and the identifier of the relay device;

receiving a first message from an access gateway function (AGF) entity, wherein the first message comprises the identifier of the relay device and a second registration request message, and wherein the second registration request message comprises the identifier of the remote device;

receiving, from the AGF entity, a second message that comprises a line identifier and a third registration request message that comprises the identifier of the remote device; and obtaining the identifier of the relay device based on the line identifier; or receiving, from the AGF entity, a fourth registration request message that comprises the identifier of the remote device and the line identifier; and obtaining the identifier of the relay device based on the line identifier.

3. The device access method of claim 1, wherein after obtaining the identifier of the remote device and the identifier of the relay device, the device access method further comprises:

establishing a correspondence between the remote device and the relay device based on the identifier of the remote device and the identifier of the relay device; and sending, according to the correspondence, a quality of service (QoS) rule corresponding to a service flow of the remote device to the relay device after sending the registration success message to the remote device, wherein the QoS rule is used to perform QoS control on a data packet received from the remote device.

4. The device access method of claim 1, wherein the relay device is a fixed network device comprising a residential gateway or a home gateway customer premise equipment (CPE).

5. A mobility management entity, comprising:

a memory configured to store computer-executable instructions; and a processor coupled to the memory, wherein, when executed by the processor, the computer-executable instructions cause the mobility management entity to be configured to:

obtain an identifier of a remote device and an identifier of a relay device;

determine, based the identifier of the remote device or the identifier of the relay device, to allow the remote device to access a network using the relay device;

send, in response to the determining, a registration success message to the remote device using the relay device;

obtain context information or subscription data of the relay device based on the identifier of the relay device; and either determine, based on the context information or the subscription data of the relay device, that the relay device allows the remote device to access the network using the relay device; or determine, based on the context information of the relay device, that a first access point at which the relay device is currently located allows the remote device to access the network using the first access point;

obtain subscription data of the remote device based on the identifier of the remote device; and either determine, based on the subscription data of the remote device, that the remote device is allowed to access the network using the relay device; or determine, based on the subscription data of the remote device, that a second access point at which the remote device is currently located allows the remote device to access the network;

obtain the context information or the subscription data of the relay device based on the identifier of the relay device; and either determine, based on the context information or the subscription data of the relay device, to allow the remote device to access the network using the relay device, or determine, based on the context information of the relay device, that the first access point allows the remote device to access the network by using the first access point; or obtain subscription data of the remote device based on the identifier of the remote device, and either determine, based on the subscription data of the remote device, to allow the remote device to access the network using the relay device; or determine, based on the subscription data of the remote device, that the second access point allows the remote device to access the network.

6. The mobility management entity of claim 5, wherein the computer-executable instructions further cause the mobility management entity to be configured to:
receive a first registration request message from the remote device, wherein the first registration request message comprises the identifier of the remote device and the identifier of the relay device;
receive a first message from an access gateway function (AGF) entity, wherein the first message comprises the identifier of the relay device and a second registration request message, and wherein the second registration request message comprises the identifier of the remote device;
receive, from the AGF entity, a second message that comprises a line identifier and a third registration request message that comprises the identifier of the remote device; and obtain the identifier of the relay device based on the line identifier; or
receive, from the AGF entity, a fourth registration request message that comprises the identifier of the remote device and the line identifier; and obtain the identifier of the relay device based on the line identifier.

7. The mobility management entity of claim 5, wherein the computer-executable instructions further cause the mobility management entity to be configured to:
establish a correspondence between the remote device and the relay device based on the identifier of the remote device and the identifier of the relay device after obtaining the identifier of the remote device and the identifier of the relay device; and
send, according to the correspondence, a quality of service (QoS) rule corresponding to a service flow of the remote device to the relay device after sending the registration success message to the remote device, wherein the QoS rule is used to perform QoS control on a data packet received from the remote device.

8. A device access system, comprising:
an access gateway function (AGF) entity; and
a mobility management entity communicatively coupled to the AGF entity and configured to:
obtain an identifier of a remote device and an identifier of a relay device;
determine, based on the identifier of the remote device or the identifier of the relay device, to allow the remote device to access a network using the relay device;
send, in response to the determining, a registration success message to the AGF entity;
obtain context information or subscription data of the relay device based on the identifier of the relay device; and either determine, based on the context information or the subscription data of the relay device, that the relay device allows the remote device to access the network using the relay device; or determine, based on the context information of the relay device, that a first access point at which the relay device is currently located allows the remote device to access the network using the first access point;
obtain subscription data of the remote device based on the identifier of the remote device; and either determine, based on the subscription data of the remote device, that the remote device is allowed to access the network using the relay device; or determine, based on the subscription data of the remote device, that a second access point at which the remote device is currently located allows the remote device to access the network;
obtain the context information or the subscription data of the relay device based on the identifier of the relay device; and either determine, based on the context information or the subscription data of the relay device, to allow the remote device to access the network using the relay device, or determine, based on the context information of the relay device, that the first access point allows the remote device to access the network by using the first access point; or
obtain subscription data of the remote device based on the identifier of the remote device, and either determine, based on the subscription data of the remote device, to allow the remote device to access the network using the relay device; or determine, based on the subscription data of the remote device, that the second access point allows the remote device to access the network,
wherein the AGF entity is configured to:
receive the registration success message from the mobility management entity; and
send the registration success message to the remote device using the relay device.

9. The device access system of claim 8, wherein the AGF entity is further configured to:
obtain the identifier of the remote device and the identifier of the relay device; and
establish a correspondence between the remote device and the relay device based on the identifier of the remote device and the identifier of the relay device.

10. The device access system of claim 9, wherein the AGF entity is further configured to:
receive the identifier of the remote device and the identifier of the relay device from the relay device;
receive, from the relay device, a first message that comprises the identifier of the remote device and a source media access control (MAC) address; and obtain the identifier of the relay device based on the source MAC address, wherein the source MAC address is a MAC address of the relay device; or
receive, from the relay device, a second message that comprises a line identifier and the identifier of the remote device; and obtain the identifier of the relay device based on the line identifier.

11. The device access system of claim 9, wherein after obtaining the identifier of the relay device, the AGF entity is further configured to select, based on the identifier of the relay device, a mobility management entity communicatively coupled to the relay device as the mobility management entity.

12. The device access system of claim 11, wherein the AGF entity is further configured to:
determine, based on the identifier of the relay device, that a context of the relay device is stored in the AGF entity, wherein the context of the relay device comprises a mobility management entity identifier; and
determine a mobility management entity corresponding to the mobility management entity identifier as the mobility management entity.

13. The device access system of claim 8, wherein the AGF entity is further configured to:
allocate a non-access stratum (NAS) Internet Protocol (IP) address or a local IP address of the remote device to the remote device after establishing a correspondence between the remote device and the relay device, wherein the local IP address of the remote device identifies the remote device, and wherein the NAS IP address identifies a NAS message; and send the NAS IP address or the local IP address to the remote device.

14. The device access system of claim 8, wherein the AGF entity is further configured to:

allocate a non-access stratum (NAS) media access control (MAC) address to the remote device after establishing a correspondence between the remote device and the relay device, wherein the NAS MAC address identifies a NAS message; and send the NAS MAC address to the remote device.

15. The device access system of claim 8, wherein the device access system further comprises the relay device, and wherein the relay device is configured to:

allocate a non-access stratum (NAS) Internet Protocol (IP) address or a local IP address of the remote device to the remote device, wherein the local IP address of the remote device identifies the remote device, and wherein the NAS IP address identifies a NAS message; and send the NAS IP address or the local IP address of the remote device to the remote device.

16. The device access system of claim 8, wherein the device access system further comprises the relay device, and wherein the relay device is configured to:

allocate a non-access stratum (NAS) media access control (MAC) address to the remote device, wherein the NAS MAC address identifies a NAS message; and send the NAS MAC address to the remote device.

17. The device access system of claim 8, wherein the device access system further comprises the relay device, and wherein the relay device is configured to:

receive a quality of service (QoS) rule corresponding to a service flow of the remote device from the mobility management entity; and perform, according to the QoS rule, QoS control on a data packet received from the remote device.

18. The device access system of claim 17, wherein the relay device is further configured to perform QoS control on the data packet by:

parsing an Internet Protocol (IP) header of the data packet to obtain flow description information of a target data packet; and determining whether the flow description information of the target data packet matches data flow description information in the QoS rule.

19. The device access system of claim 8, wherein the device access system further comprises the relay device, and wherein the relay device is configured to:

receive the identifier of the remote device and the identifier of the relay device from the remote device; and send the identifier of the remote device and the identifier of the relay device to the AGF entity; or receive the identifier of the remote device from the remote device; and send the identifier of the remote device and the identifier of the relay device to the AGF entity.

20. The device access system of claim 8, wherein the device access system further comprises the remote device, wherein the remote device is configured to send a non-access stratum (NAS) message to the relay device, and wherein a destination address of the NAS message is a NAS Internet Protocol (IP) address or a NAS media access control (MAC) address.

21. The device access system of claim 8, wherein the AGF entity is further configured to:

receive a Dynamic Host Configuration Protocol (DHCP) request message from the remote device, wherein the DHCP request message requests an Internet Protocol address; and send a DHCP response message to the remote device using the relay device, wherein the DHCP response message includes a local Internet Protocol (IP) address of the remote device and a non-access stratum (NAS) IP address of the remote device.

* * * * *